United States Patent
Vleugels et al.

(10) Patent No.: US 8,571,005 B1
(45) Date of Patent: Oct. 29, 2013

(54) METHOD AND APPARATUS FOR SYNCHRONIZATION OF A MASTER TIMEBASE WITH ONE OR MORE SLAVE TIMEBASES USING INDIRECT SIGNALLING OF TIMING INFORMATION

(75) Inventors: Katelijn Vleugels, San Carlos, CA (US); Barry Thompson, Menlo Park, CA (US); Nils Bunger, Mountain View, CA (US); Ilya Minkin, Los Altos, CA (US)

(73) Assignee: ATMEL Corporation, San Jose, CA (US)

( * ) Notice: Subject to any disclaimer, the term of this patent is extended or adjusted under 35 U.S.C. 154(b) by 1682 days.

(21) Appl. No.: 11/423,657

(22) Filed: Jun. 12, 2006

Related U.S. Application Data

(63) Continuation of application No. 11/376,709, filed on Mar. 14, 2006, now abandoned.

(60) Provisional application No. 60/725,835, filed on Oct. 11, 2005.

(51) Int. Cl.
*H04J 3/06* (2006.01)
*G06F 5/16* (2006.01)

(52) U.S. Cl.
USPC .......................................... 370/350; 709/248

(58) Field of Classification Search
None
See application file for complete search history.

(56) References Cited

U.S. PATENT DOCUMENTS

| | | |
|---|---|---|
| 4,837,786 A | 6/1989 | Gurantz et al. |
| 4,894,846 A | 1/1990 | Fine |
| 5,418,496 A | 5/1995 | Ford et al. |
| 5,625,882 A | 4/1997 | Vook et al. |
| 5,898,929 A | 4/1999 | Haartsen |
| 6,373,858 B1 | 4/2002 | Soleimani et al. |
| 6,434,395 B1 | 8/2002 | Lubin et al. |
| 6,463,109 B1 | 10/2002 | McCormack et al. |
| 6,647,246 B1 | 11/2003 | Lu |
| 6,665,316 B1 * | 12/2003 | Eidson .......................... 370/509 |
| 6,771,614 B1 | 8/2004 | Jones, IV et al. |
| 6,816,510 B1 * | 11/2004 | Banerjee ....................... 370/503 |
| 6,967,936 B1 | 11/2005 | Laroia et al. |
| 7,330,524 B2 | 2/2008 | Zhang et al. |
| 2002/0007465 A1 | 1/2002 | Dive |
| 2002/0026523 A1 | 2/2002 | Mallory et al. |
| 2002/0031196 A1 * | 3/2002 | Muller et al. .................. 375/354 |
| 2002/0136198 A1 * | 9/2002 | Findikli ....................... 370/350 |
| 2004/0008973 A1 * | 1/2004 | Marshall et al. ................ 386/85 |

(Continued)

OTHER PUBLICATIONS

X. Huang, A New Probabilistic Clock Synchronization Algorithm, Master's Thesis, Michigan Technological University, 2001, pp. 1-53.*

(Continued)

*Primary Examiner* — John Blanton
*Assistant Examiner* — Christopher Crutchfield
(74) *Attorney, Agent, or Firm* — Fish & Richardson P.C.

(57) ABSTRACT

In a communication system comprising one master device and one or more slave devices, the slave devices synchronize to a common timebase maintained at the master device without requiring transmission of accurate and real time master timer information from the master device. In one approach, a slave device sends timing information to the master device, the timing information representing the slave device timebase, and the master device sends back correction information to the slave device, the correction information representing a difference between the slave device timebase and the master device timebase, the correction information being usable independent of the timing of sending back the correction information.

35 Claims, 12 Drawing Sheets

(56) References Cited

U.S. PATENT DOCUMENTS

| | | | |
|---|---|---|---|
| 2004/0059396 A1* | 3/2004 | Reinke et al. | 607/60 |
| 2004/0114607 A1* | 6/2004 | Shay et al. | 370/395.42 |
| 2004/0141526 A1* | 7/2004 | Balasubramanian et al. | 370/503 |
| 2004/0156309 A1 | 8/2004 | Chadha et al. | |
| 2004/0203474 A1 | 10/2004 | Miller et al. | |
| 2005/0286466 A1* | 12/2005 | Tagg et al. | 370/329 |

OTHER PUBLICATIONS

P. Ruff, Applied Computer Science Problems: Clock and State Synchronization, Jan. 22, 2005, pp. 1-32.*

S. Ganeriwal, R. Kumar and M. Srivastava, Timing-sync Protocol for Sensor Networks, ACM Conference on Embedded Networked Sensor Systems, Nov. 7, 2003, pp. 1-12.*

R. Gusella, The Accuracy of the Clock Synchronization Achieved by TEMPO in Berkley UNIX 4.3 BSD, Report No. UCB/CSD 87/338, UC Berkley, Jan. 1987, pp. 1-14.*

R. Gusella and S. Zatti, The Berkley UNIX 4.3 BSD Time Synchronization Protocol: Protocol Specification, UC Berkley Report No. UCB/CSD/85/05, Jun. 1985, pp. 1-13.*

F. Cristain, Probablistic Clock Synchronization, Distributed Computing, vol. 3, pp. 146-158, Springer, 1989.*

M. Mock, R. Frings, E. Nett and S. Trikaliotis, Continuous Clock Synchronization in Wireless Real-Time Applications, IEEE Conference on Reliable Distributed Systems, 2000, pp. 125-132.*

G. Garner, K. Hollander, Analysis of Clock Synchronization Approaches for Residential Ethernet, Presentation to IEEE 802.3 Residential Ethernet Study Group Sep. 2005 joint ResE/802.1 Interim Meeting, Sep. 30, 2005, pp. 1-19.*

H. Kopetz and W. Ochsenreiter, Clock Synchronization in Distributed Real Time Systems, IEEE Transactions on Computers, vol. C-36, Aug. 1981, pp. 933-940.*

Office Action for U.S. Appl. No. 11/423,499, dated Mar. 4, 2009.
Office Action for U.S. Appl. No. 11/423,499, dated Nov. 16, 2009.
Office Action for U.S. Appl. No. 11/423,499, dated Jul. 20, 2010.
Office Action for U.S. Appl. No. 11/423,637, dated Dec. 9, 2008.
Office Action for U.S. Appl. No. 11/423,637, dated Jun. 9, 2009.
Office Action for U.S. Appl. No. 11/423,637, dated Nov. 23, 2009.

* cited by examiner

METHOD AND APPARATUS FOR SYNCHRONIZATION OF A MASTER TIMEBASE WITH ONE OR MORE SLAVE TIMEBASES USING INDIRECT SIGNALLING OF TIMING INFORMATION

CROSS-REFERENCES TO RELATED APPLICATIONS

This application is a continuation of U.S. patent application Ser. No. 11/376,709, filed Mar. 14, 2006, which claims the benefit of and is a non-provisional of U.S. Patent Application Ser. No. 60/725,835 filed on Oct. 11, 2005, which is incorporated by reference in its entirety for all purposes.

FIELD OF THE INVENTION

The present invention relates to electronic devices that operate according to timebases in general and more particularly to electronic devices that require synchronization of timebases between devices wherein conventional simple approaches to clock synchronization are not available.

BACKGROUND OF THE INVENTION

Wireless communication among electronic devices has been increasing as the benefits and conveniences of wireless communication become more preferred. A wireless communication system or wireless network is often described as containing nodes (or more precisely, circuitry associated with the concept of a node) and a wireless medium (WM) over which the nodes' circuitry communicate to convey information. Where some action or activity is described as happening at (or being done at) a node, it should be understood that the electronic device and/or network interface that is at (or simply is) the node is the circuitry that is performing the action or activity. For example, sending data from node A to node B means transmitting a signal from circuitry associated with node A and receiving that signal (or more precisely, the transmitted signal modified by the medium) using circuitry associated with node B.

The information conveyed between nodes can be digital data and digitized analog signals, or other forms of information, but communication system design often assumes that digital data is being conveyed and higher network layers interpret the data appropriately. For purposes herein, it is assumed that data exists at one node, is provided to lower network layers, is conveyed to another node over a WM, is received by another node correctly or incorrectly and then is conveyed to upper network layers at the receiver. In one model, two networked devices run applications that pass data between themselves by having the sending device's application convey data to an application layer of a network stack, which conveys data to lower levels, ultimately to a medium access control (MAC) layer and a physical network (PHY) layer, and the process is inverted at the recipient.

To set up a wireless network, all that is needed is a plurality of electronic "node" devices capable of transmitting and receiving data in a manner understood by the two (or more) nodes involved in a conversation, with the node devices appropriately placed such that they can communicate in the medium that exists between the devices. The medium could be some type of dielectric material, but more commonly, the medium is the air space and objects (walls, chairs, books, glass. etc.) that are between devices or are positioned such that they have an effect on the signals transmitted between devices. Presumably, the node devices are assigned unique identifiers to distinguish transmissions, but this might not always be necessary. Examples of such unique identifiers are MAC addresses and IP addresses.

As the existence of various wireless media and their properties are known and are not the focus of this disclosure, the medium is often just shown in the attached figures as a cloud. Thus, it should be understood that supplier of a set of two or more powered devices that can communicate supplies a wireless network; the wireless medium is presumed.

Wireless communication systems can be categorized based on coverage range, which in some cases is dictated by use. A wireless local area network or "WLAN", has a typical coverage range on the order of 300 feet and is useful for providing communications between computing devices in some (possibly loosely) defined space such as a home, office, building, park, airport, etc. In some modes of operation, one or more of the nodes is coupled to a wired network to allow other nodes to communicate beyond the wireless network range via that wired network. In 802.11 terminology, such nodes are referred to as "access points" and the typical protocol is such that the other nodes (referred to as "stations") associate with an access point and communication is generally between a station and an access point. Some wireless networks operate in an "ad hoc" mode, wherein access node devices communicate with each other without an access point being present.

A personal area network or "PAN" is a short-range wireless network, with typical coverage ranges on the order of 30 feet, usable to connect peripherals to devices in close proximity, thereby eliminating cables usually present for such connections. For example, a PAN might be used to connect a headset to a mobile phone or music/audio player, a mouse or keyboard to a laptop, a PDA or laptop to a mobile phone (for syncing, phone number lookup or the like), etc. Yet another example of a wireless PAN application is wireless medical monitoring devices that wirelessly connect monitoring hardware to a pager or similar read-out device. Yet another example is a remote control that connects to a wireless-enabled electronic device.

Some networks might fall in a gray area between a WLAN and a PAN, but in many cases, a network is clearly one or the other. A personal area network (PAN) is generally used for the interconnection of information technology devices within the range of an individual person, typically within a range of 10 meters. For example, a person traveling with a laptop will likely be the sole user of that laptop and will be the same person handling the personal digital assistant (PDA) and portable printer that interconnect to the laptop without having to plug anything in, using some form of wireless technology. Typically, PAN nodes interact wirelessly, but nothing herein would preclude having some wired nodes. By contrast, a wireless LAN tends to be a local area network (LAN) that is connected without wires and serves multiple users.

Equipment connecting to a wireless communication system in general, and to a wireless PAN communication system in particular, is typically used for applications where power usage, weight, cost and user convenience are very important. For example, with laptops, low-cost accessories are preferable, and it is critical that the power usage of such accessories be minimized to minimize the frequency at which batteries need to be replaced or recharged. The latter is a burden and annoyance to the user and can significantly reduce the seamless user experience.

Weight and complexity are additional concerns in many wireless communication systems. Particularly with mobile devices such as laptops, weight is a concern and the user would rather not have to deal with the hassle of carrying around a multiplicity of devices. Mobile devices are devices that can be expected to be in use while moving, while portable devices are devices that are movable from place to place but generally are not moving when in use. The considerations for mobile devices also apply to portable devices, albeit sometimes with less of a concern. For example, with a wireless connection of a peripheral to a laptop, both devices are likely to be used while mobile or moved frequently and carried around. Thus, weight and the number of devices is an important consideration. With portable devices, such as a small desktop computer with a wireless trackball, as long as the total weight is below a user's carrying limit, the weight is not as much a concern. However, battery life is often as much a concern with portable devices as it is with mobile devices.

There are shades of grey between "portable" and "mobile" and it should be understood that the concerns of mobile applications and portable applications can be considered similar, except where indicated. In other words, a mobile device can be a portable device in the examples described herein.

Where a computing and/or communication device connects to a WLAN, it uses wireless circuitry that often times are already built into the computing device. If the circuitry is not built in, a WLAN card (such as a network interface card, or "NIC") might be used. Either way, some antenna circuitry is used and power is required to run that circuitry.

Where a device also connects wirelessly to peripherals or other devices over short links often referred to as forming a "personal area network" or "PAN", circuitry is needed for that connection as well. This circuitry is typically provided with an external interface unit that is plugged into or onto the device. For example, where the device is a laptop, the circuitry might be provided by a Universal Serial Bus (USB) dongle that attaches to a USB port of the laptop. The USB dongle contains the radio circuitry needed to communicate wirelessly over the short wireless links.

In general, a wireless connection between two or more devices requires that each device include wireless network circuitry for conveying signals over the medium and receiving signals over the medium, as well as processing/communication circuitry to receive, process and/or convey data and/or signals to that wireless network circuitry. The processing/communication circuitry could be implemented with actual circuits, software instructions executable by a processor, or some combination thereof. In some variations, the wireless network circuitry and processing/communication circuitry are integrated (such as with some PDAs, wireless mice, etc.) or are separate elements (such as a laptop as the processing/communication circuitry and a network PCMCIA card as the wireless network circuitry).

For ease of understanding this disclosure, where it is important to make the distinction between devices, a device that exists to provide wireless connectivity is referred to as a "network interface", "network interface device", "wireless network interface device" or the like, while the device for which the wireless connectivity is being provided is referred to as a "computing device" or an "electronic device" notwithstanding the fact that some such devices do more than just compute or might not be thought of as devices that do actual computing and further notwithstanding the fact that some network interface devices themselves have electronics and do computing. Some electronic devices compute and communicate via an attached network interface device while other electronic devices might have their network interface devices integrated in a non-detachable form. Where an electronic device is coupled to a wireless network interface to a wireless network, it is said that the device is a node in the network and thus that device is a "node device".

An 802.11x (x=a, b, g, n, etc.) NIC (network interface card) or 802.11x built-in circuitry might be used for networking an electronic device to the outside world, or at least to devices at other nodes of a WLAN 802.11x network, while using an external dongle or a similar interface device with Bluetooth or proprietary wireless circuitry for communication between the computing device and the peripheral or other PAN node.

A device that is equipped with an 802.11x-conformant network interface to the WM is herein referred to as a station or "STA". In 802.11 terminology, set of STAs constitutes a Basic Service Set ("BSS"). A set of STAs that communicate in a peer-to-peer configuration is referred to as an "802.11x ad-hoc" network or an independent BSS (IBSS). A set of STAs controlled by a single coordinator is referred to as an 802.11x infrastructure network. The coordinator of a BSS is herein referred to as the access point or "AP".

A typical access point device is wired to a wired network and is also wired to an external source of electricity, such as being plugged into a wall socket or wired to a building's power grid. For example, a building, an airport or other space people might occupy might have fixed access points mounted throughout the space to provide adequate network coverage for the purpose of providing access to the Internet or other network for the people occupying the space, via their portable or mobile devices. As such, access points are typically always on so that the wireless network is available whenever suitable portable or mobile devices are carried into the space.

The use of different technologies for WLAN and wireless PAN connectivity increases cost, weight and power usage (at the COORD side and/or the PER side), and impairs a seamless user experience. Those disadvantages could be resolved by equipping the peripheral or PAN nodes with 802.11x wireless circuitry, thus eliminating the dedicated PAN technologies altogether. However, PAN nodes are often very power-sensitive devices. They usually are battery-operated devices and their small form factor prohibits the use of bulky batteries with large capacity. Instead, small batteries with limited power capacity are used. Such peripherals cannot typically support the power usage requirements typical of WLAN wireless circuitry, such as 802.11x circuitry. A host of other difficulties are present in view of the optimizations, goals and designs of differing network protocols.

Another drawback is that independent LANs and PANs may interfere if they share a common frequency band.

Because of the arrangement of devices, having consistent timebases is important. In many communication systems or networks, it is desirable to have two or more electronic devices that are communicating with each other to be synchronized to a common timebase. As used herein, "master timer" refers to a circuit, code and/or logic that maintains this common timebase, and "synchronization" refers to a process whereby a timebase of one device is set into a known relationship with the timebase of another device, remote therefrom, having the master timer. The relationship can be that the timebases are set equal, or at least within a tolerance needed for a particular purpose.

Synchronization of electronic devices that are part of a communication system or network has several advantages. As an example, a common timebase may be used by one electronic device that is part of a communication system to agree on a time for exchange of data and/or control information or any other "communication event", with one or more other electronic devices that are part of the system. A communication event that includes the exchange of synchronization information is herein referred to as a "synchronization event."

A communication system implementing synchronization may comprise a first electronic device that is part of the communication system and that generates, maintains and/or implements the master timer, herein referred to as the "master device." One or more additional electronic devices, that are also part of the communication system and whose local timebases are occasionally adjusted to match that of the master timer are referred to herein as "slave devices." It should be noted that a device might be a master device, which is a master for timing purposes, but might be a slave for other purposes. For example, if two devices have a goal to mirror some data, one device has the master copy of the data and the other has the slave (mirrored) copy. The master device (for timing purposes) might be the device that is the data slave.

A master device might be a computing device having an attached wireless module that includes a wireless interface to the wireless medium. The computing device might include a detachable wireless module, and integrated wireless module, or circuitry that performs the wireless functions and other functions, but generally the wireless module has a clock usable for the master timebase. A common example is a computer (e.g., laptop, handheld, etc.) having a wireless network card or module. The wireless network card or module includes various components, such as I/O for communicating with the computer, a power bus, memory, a processor, logic or code to execute, a clock and so forth, and a wireless interface for transmitting signals into the wireless medium and for receiving signals from the wireless medium.

One example of a communication system that uses synchronization is a Wireless Local Area Network or "WLAN". Other examples include wired networks, optical networks, etc. Slightly different synchronization mechanisms exist, depending on whether the WLAN is configured in infrastructure or ad-hoc mode. For a WLAN configured in infrastructure mode, the electronic devices that comprise the WLAN, herein referred to as stations or "STAs", use a common timebase for coordinating events. The AP is a regular STA, but with additional functionality. The timer inside the AP acts as the master timer, and hence the AP is the master device of the network. All other STAs of the WLAN occasionally update their local timebase to match that of the WLAN's AP. All other STAs are therefore slave devices. To make it possible for STAs of an infrastructure network to be synchronized to the AP's timebase or master timer, the AP regularly transmits a particular type of packet, referred to as a beacon, that includes an accurate timestamp of the master timer at the exact time of beacon transmission. STAs that receive the beacon process the timestamp in the beacon and update their local timer to match the master timer. The above mentioned technique is a commonly used synchronization technique.

An important limitation of the above mentioned synchronization scheme is that it relies on the ability of the beacon transmitter to obtain and include an accurate timestamp of the master timer at the exact time of a beacon transmission or at least a determinable relationship thereto. Error or uncertainty in the generation of the timestamp or delay introduced between the generation of the timestamp and the transmission of the beacon may cause a synchronization error and may directly degrade the accuracy of the synchronization method, which in turn may result in problems among the devices. As a result, in order to achieve accurate synchronization with the above mentioned synchronization method, access to the master timer at a very low level in the system may be required. For example, in a WLAN-based communication system, the master timer might have to be available to the hardware or low-level firmware that directly generates and controls the transmission of packets over the air. Indeed, in a WLAN-based communication system, the transmission of a beacon may be delayed because of other traffic on the wireless medium. This delay is highly variable and may easily be on the order of several milliseconds. If the timestamp were generated at a higher level in the system, where there is no knowledge of medium contention or back off mechanisms implemented to avoid collisions on the wireless medium, the above described synchronization method would only be able to achieve milliseconds level of accuracy, whereas higher levels of accuracy are typically desirable.

BRIEF SUMMARY OF THE INVENTION

In embodiments of the present invention, a synchronization method allows two or more electronic devices that are part of a communication system to be synchronized to a common timebase maintained by a master timer, without requiring the real-time transmission of accurate master timer information. The technique is especially useful when applied to a communication system where the master timer is not available at the level that controls the exact timing of packet transmissions. This may, for example, be the case when the master device of a communication system uses or re-uses a wireless module that is available inside the master device, but uses a driver at a higher level in the master device to control the communication with its slave devices, in which case the master device might not be able to control when it receives a timestamp and when it transmits a packet that might contain that timestamp. Examples of drivers include, but are not limited to, protocol drivers or application drivers. A timer inside a wireless module of the master device that controls transmission of packets might not be available to the driver.

The technique may be applied in a communication system where it is desirable that the timer inside the wireless module of the master device determines the common timebase, but where the master device does not have the ability to transmit real-time accurate timing information of the timer inside the wireless module.

In one method, a slave device that wants to be synchronized to the master timer of a communication system, occasionally transmits a signal (for example, as a header field of a packet) with real-time timing information of its local timebase, herein referred to as a "slave timer", to the master device. Upon reception of the signal, the master device processes the timing information from the slave device and sends timing correction information back to the slave device. The timing correction information may be sent immediately after reception of the timing information from the slave device or some time later. Upon reception of the timing correction information, the slave device updates its local timer based on the timing correction information provided by the master device.

One advantage is that synchronization allows devices to power down part or all of their circuitry or perform different tasks in between communication events, in effect scheduling communication events so that receivers need not be constantly at the ready for unscheduled communication events. Scheduling might include devices agreeing on a common wake-up time for reception and/or transmission of signals between devices. More accurate synchronization allows for tighter wake-up schedules, which saves power without loss of data.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 3 comprises several examples of elements of a PWN and an SWN.

DESCRIPTION OF THE INVENTION

Figure 1:
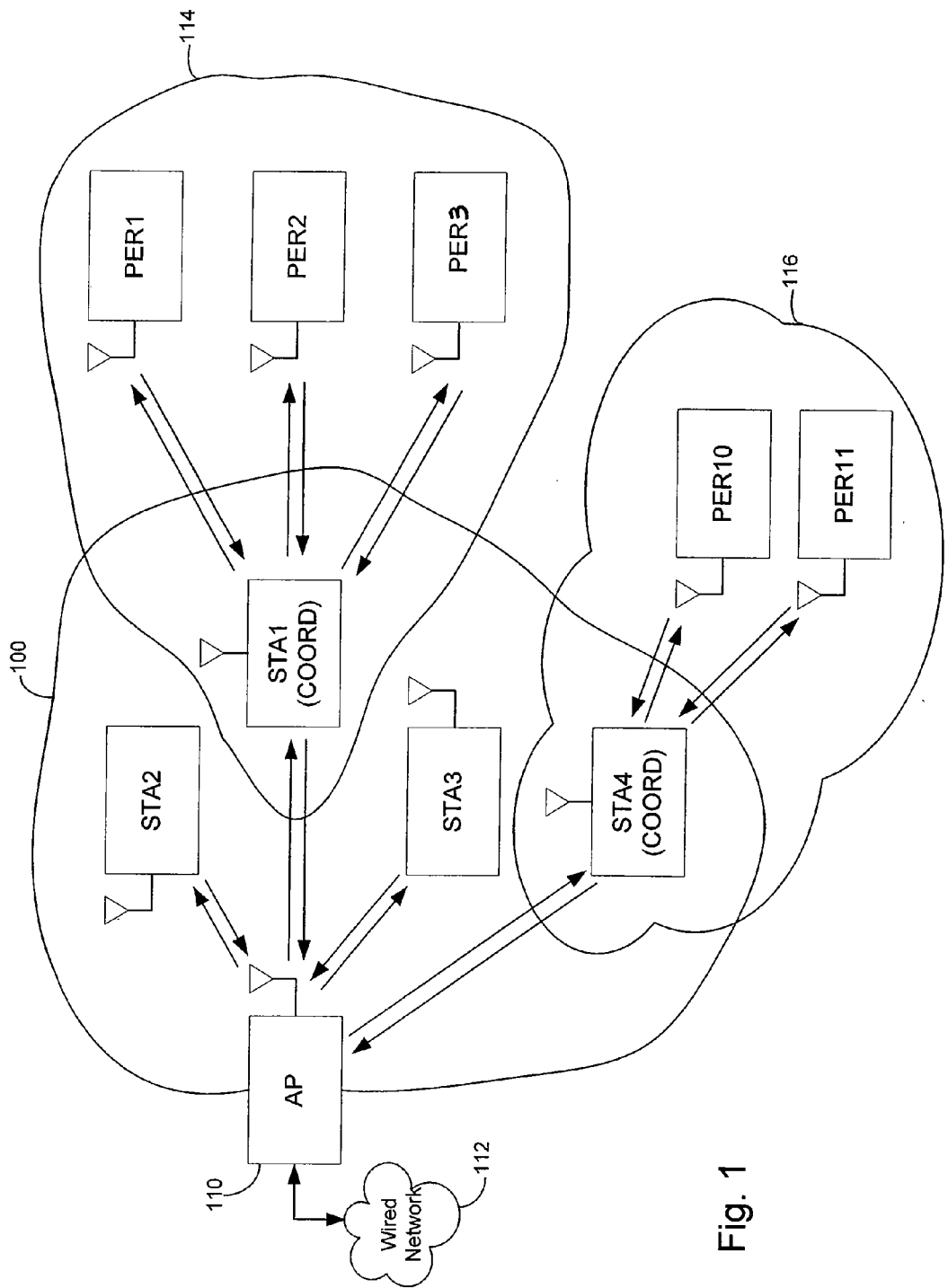
FIG. 1 is a block diagram illustrating various devices operating as part of a primary wireless network (PWN), a secondary wireless network (SWN), or both, wherein the SWN operates using an SWN protocol that co-exists with the PWN protocol.

The present disclosure describes methods and apparatus for operating a secondary wireless network ("SWN") in the presence of a primary wireless network ("PWN"), including features, elements, configurations and/or programming that allow for co-existence of SWN devices in a space where PWN traffic might occur, as well as features, elements, configurations and/or programming that include coordination between a PWN and an SWN (or pluralities of these) such that a device might handle traffic for each of the networks present.

For example, a computing device might have a common network interface that allows the computing device to be a node in the PWN and a node in the SWN. In a particular example, a computing device is an 802.11x STA that is a member of a PWN capable of associating with and communicating with an AP for that PWN (as well as possibly other devices in that PWN) using a network interface while also elements of that same network interface are used to simultaneously participate as a WPAN coordinator ("COORD") to coordinate the SWN, such that the COORD can communicate with members of one or more SWN without losing the COORD's connectivity to the primary network and using common hardware components to interface to both networks. Where a COORD is connectable to the PWN, it is referred to as a "dual-net" device, as it coordinates communication over the SWN such that it can be connected to both simultaneously, possibly including steps that involve signaling within the PWN as part of SWN activity (e.g., reserving the PWN to avoid interference before using the SWN).

In some instances, the COORD is not set up to connect to the PWN, but it still performs the necessary actions to coordinate traffic for the SWN it coordinates, including performing actions that improve coexistence of the PWN and SWN.

In the general example, the computing device is a portable and/or mobile computing and/or communications device with some computing capability. Examples of computing devices include laptop computers, desktop computers, hand-held computing devices, pagers, cellular telephones, devices with embedded communications abilities and the like. Examples of peripheral devices include typical computer, telephone etc. accessories where wireless connections are desired, but might also include less common devices, such as wearable devices that communicate with other devices on a person or even to communicate with other nearby devices, possibly using the electrical conductivity of the human body as a data network. For example, two people could exchange information between their wearable computers without wires, by transmission through the air, or using their bodies and/or clothing.

The computing devices may interface to 802.11 WLANs or other wireless networks to communicate with other network nodes, including nodes accessible through wired connections to the wireless network (typically via an access point). The computing devices also may interface to PAN devices over a personal area network (PAN), such as wireless headsets, mice, keyboards, accessories, recorders, telephones and the like. A wide variety of PAN devices are contemplated that are adapted for short-range wireless communications, typically bi-directional and typically low power so as to conserve a PAN device's limited power source. Some PAN devices might be unidirectional, either receive-only or transmit-only, devices.

In a typical approach, where a STA needs to connect to more than one wireless network, the STA associates with one wireless network and then when associating with another wireless network, it disassociates with the first wireless network. While this is useful for a WLAN where a STA might move out of one network's range and into the range of another network, this is not desirable when latency needs to be less than an association set-up time. The latency incurred with this switching procedure easily amounts to several hundreds of milliseconds.

In certain applications, it may be desirable for a STA to connect to multiple networks without incurring long switching-induced latencies. For example, consider a typical PER device, that of a cordless mouse. Since update rates for a cordless mouse during normal operation are on the order of 50 to 125 times per second, switching-induced latencies involved with 802.11x association set ups are not acceptable. Furthermore, the switching overhead significantly reduces the STA's usable communication time, defined as the time that the STA is available to transmit or receive data.

In a specific embodiment of the invention, a wireless peripheral like a mouse, is attached to an 802.11x-enabled computing device like a laptop computer, using the 802.11x wireless circuitry inside the laptop, or connected to the laptop via a NIC card. At the same time, the laptop may be connected to the Internet via a regular WLAN network, using the same 802.11x circuitry. Herein, a peripheral or PAN node will be referred to as "PER". Multiple PERs can connect to a single wireless PAN. The wireless device coordinating the wireless PAN is called the coordinator ("COORD"). Where the COORD is also able to connect to the 802.11x network, the COORD is referred to as a "dual-net" device, since it handles both networks. A typical dual-net device in this example is a device that is a STA on an 802.11x network while also having wireless peripherals used by applications running on that device.

While not always required, the PERs are power-sensitive devices. It should be understood that an object labeled "PER"

need not be a peripheral in the sense of an object with a purpose to serve a particular purpose, but rather an object that performs the behaviors herein referred to as behaviors of a PAN node. For example, a printer can be a PER when it is connected to a desktop computer via a PAN, but some other device not normally thought of as a peripheral can be a PER if it behaves as one.

Examples of the concepts and disclosures provided above will now be further explained with reference to the figures. In the figures, like items are referenced with a common reference number with parenthetical numbers to indicate different instances of the same or similar objects. Where the number of instances is not important for understanding the invention, the highest parenthetical number might be a letter, such as in "100(1), 100(2), . . . , 100(N)". Unless otherwise indicated, the actual number of items can differ without departing from the scope of this disclosure.

Specifically, FIG. 1 illustrates various devices operating as part of a primary wireless network (PWN) 100, a secondary wireless network (SWN) (such as 114 or 116), or both. In the figure, an access point (AP) 110 supports an infrastructure mode for PWN 100, coupling various stations to the network allowing, for example, network traffic between a station and a wired network 112. By communicating with the AP, a station can retrieve information from the Internet and exchange data with other stations that may or may not be part of the Basic Service Set (BSS) managed by the AP.

As shown in the example, the stations present are STA1, STA2, STA3 and STA4. Each station is associated with a node in PWN 100 and has the necessary hardware, logic, power, etc. to be a node device in PWN 100. Station STA1 also coordinates SWN 114 as the COORD for that network shown comprising PER1, PER2 and PER3. Likewise, station STA4 coordinates SWN 116 as the COORD for the network comprising STA4, PER10 and PER11. In FIG. 1, each node device is shown with an antenna to indicate that it can communicate wirelessly, but it should be understood that an external antenna is not required.

Other network components and additional instances might also be present. For example, more than one AP might be present, there might be overlaps of BSSes and other network topologies might be used instead of the exact one shown in FIG. 1 without departing from the scope of the invention. Examples used herein for PWN 100 include 802.11x (x=a, b, g, n, etc.), but it should be understood that the primary wireless network may well be another network selected among those in present use or available when the primary wireless network is implemented.

In this example, the secondary wireless networks are assumed to be used for PAN functionality. The PAN can be used for, but is not limited to, fixed data rate applications where exchange of data can be scheduled and the amount of data to be exchanged is known and a single dual-net device might interface with multiple PERs. Because the dual-net device may be a regular STA in the first WLAN, it can power-down as needed without problems, unlike an access point. However, since it is also the COORD, peripheral communication could be lost if the peripheral is powered up but the dual-net device/COORD is not. This can be dealt with using mutually agreeable inactivity periods.

Figure 2:
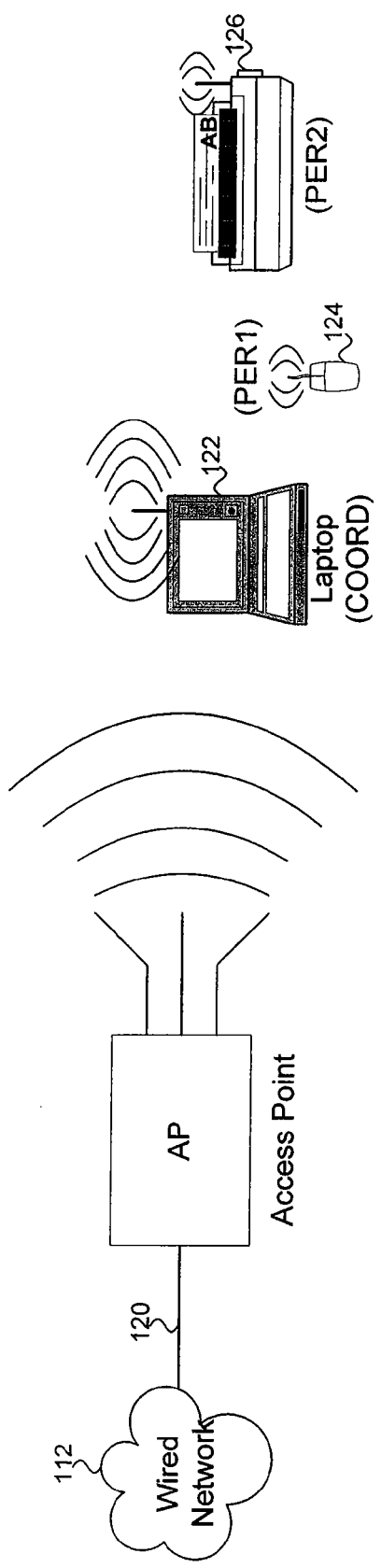
FIG. 2 is a block diagram illustrating a subpart of the elements of FIG. 1, in greater detail.

FIG. 1 shows, at a high level, the interplay among various nodes of various networks. FIG. 2 illustrates a subpart of the elements of FIG. 1, illustrating in greater detail. In this figure, AP 110 is coupled to wired network 112 via cable 120 and might communicate using any suitable wire-based networking protocol. On the other side, AP 110 transmits signals to a station device, in this case a laptop 122, using the AP's antenna and those signals are received by laptop 112 using its antenna. Signals can also flow in the other direction. Such communications would be done according to a PWN protocol, such as an 802.11x protocol.

Laptop 122 (a dual-net device in this example) in turn can communicate with the peripherals shown, in this example a wireless mouse (PER1) 124 and a wireless printer (PER2) 126. It may be that power for wireless printer 126 comes from an external power outlet, in which case power consumption might be less of a concern than with mouse 124 if it operates on battery power. Nonetheless, both peripherals might use the same power-saving protocol. Power conservation might also be performed on the dual-net device, for example, when it is a laptop.

FIG. 3 comprises several views of network layouts of elements of a PWN and a SWN.

Figure 3A:
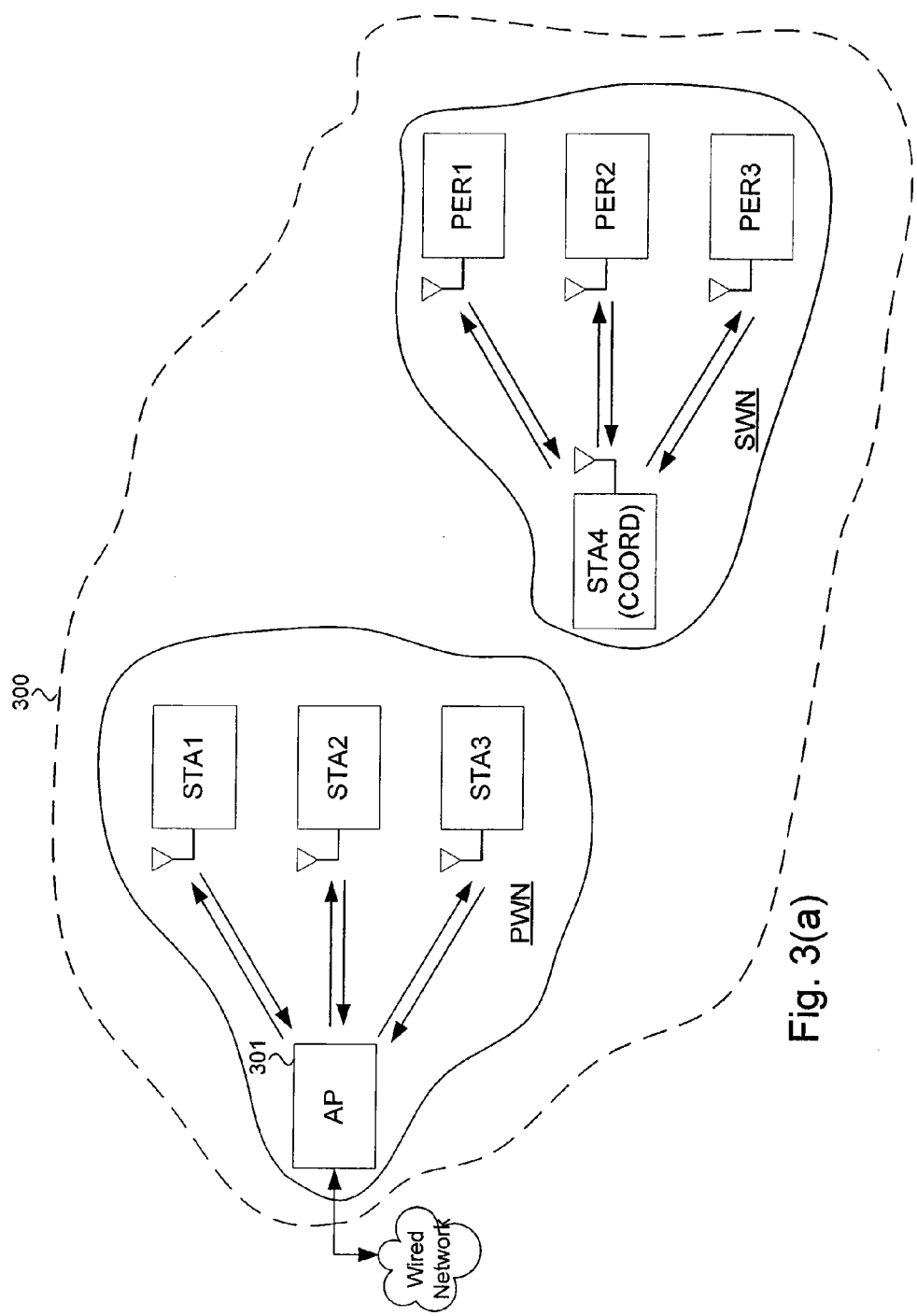
FIG. 3(a) is a block diagram showing elements of a PWN and an SWN that co-exist, but do not necessarily span the two networks.

FIG. 3(a) is a block diagram showing wireless elements that might be operating in a common space 300 such that they share a wireless medium or parts of it. In the description that follows, the examples assume that the range of an access point, AP 301, is the common space 300. In other examples, the common space is the range of the AP and STA devices in the AP's BSS, or some other variation. As shown in FIG. 3(a), AP, STA1, STA2 and STA3 form the primary wireless network PWN, while devices STA4, PER1, PER2, and PER3 form the secondary wireless network SWN. STA4 is the master for the SWN. Note that STA4 need not be associated as a STA with AP 301.

Figure 3B:
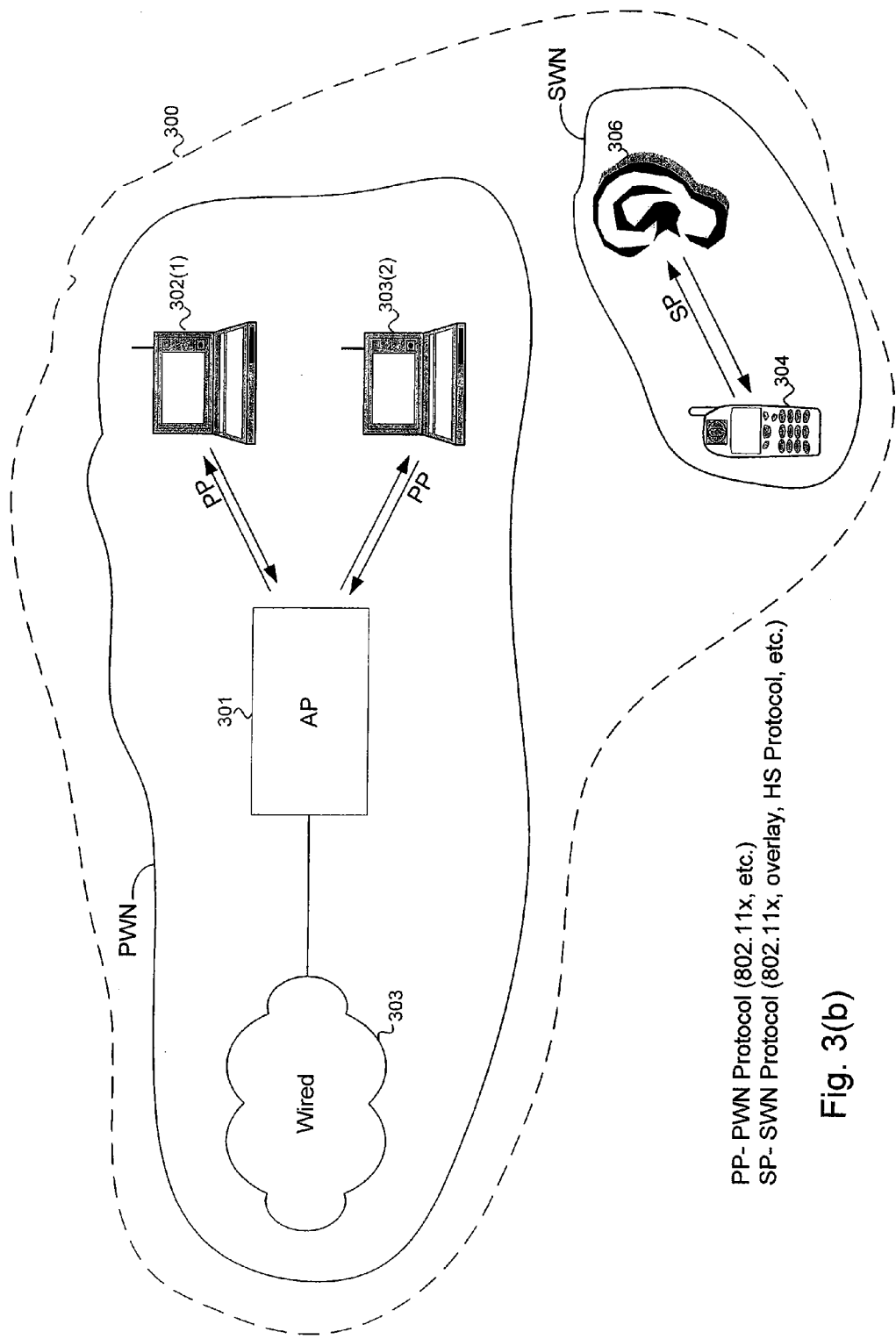
FIG. 3(b) is a block diagram showing specific objects that might be used as the elements of a PWN and an SWN.

FIG. 3(b) illustrates a more specific example. In that figure, PWN is managed by AP 301 and has node devices 302(1) and 302(2) (laptops in this example figure) associated with the PWN. A mobile phone 304 is the master for the SWN that includes a headset 306. Mobile phone 304 may well not have the capability to join PWN, but since the PWN and SWN share the same wireless medium, preferably mobile phone 304 has COORD functions that would enhance coexistence of PWN devices and SWN devices. AP 301 is also coupled to a wired network 303.

The various protocols used between devices are marked as "PP" for PWN protocol, which might be an 802.11x protocol or the like and "SP" for SWN protocol, which might be a modified 802.11x protocol, an overlay protocol, or the like. As used herein, an overlay protocol is an SWN protocol that has elements that are reuses of elements of a PWN protocol to provide one or more advantages, such as ability to use some common hardware components for both networks, the ability to communicate in the SWN without having to disassociate with the PWN, the ability to signal in the SWN with signals that are understood by SWN devices but are such that they are, if not understood, are acted upon by PWN devices to provide desirable actions. For example, an overlay protocol might be such that a PWN-only device that hears an SWN packet will be able to decode the packet enough to determine that the packet is not for the PWN-only device and also determine how long the wireless medium will be busy with SWN traffic so that the PWN-only device can appropriately defer.

Of course, if all of the PWN devices and SWN devices had the same constraints and could support a wider-area network standard protocol, then perhaps all of the devices would just be nodes in one network and use that network's protocol for contention, coordination, and the like. However, where one-size-fits-all does not work, it is preferred that some sort of coexistence enhancement occur.

Figure 3C:
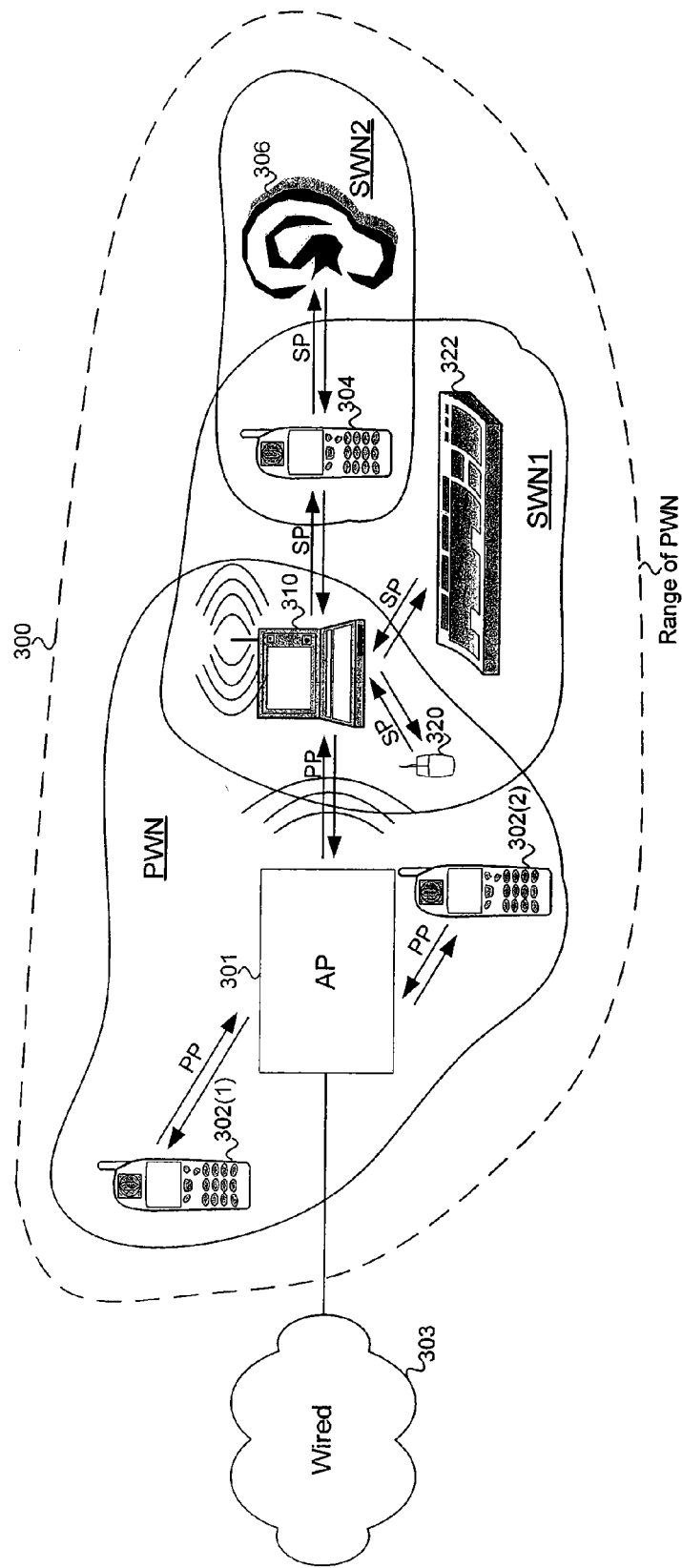
FIG. 3(c) is a block diagram of a variation of subparts wherein objects might span the PWN and the SWN.

FIG. 3(c) is a block diagram of another topology example, wherein at least one device spans a network. In that example, AP 301 communicates with an 802.11x-enabled Personal Digital Assistant (PDA) 305 and an 802.11x-enabled mobile phone 307, while phone 307 acts as a COORD for a secondary network to interact with a wireless headset 306. In some variations, PDA 305 and phone 307 might communicate in ad hoc mode. As an example of the use of these elements, phone 307 might be used to simultaneously conduct a wireless Voice-over-IP (VoIP) call and attach wireless headset 306.

Figure 3D:
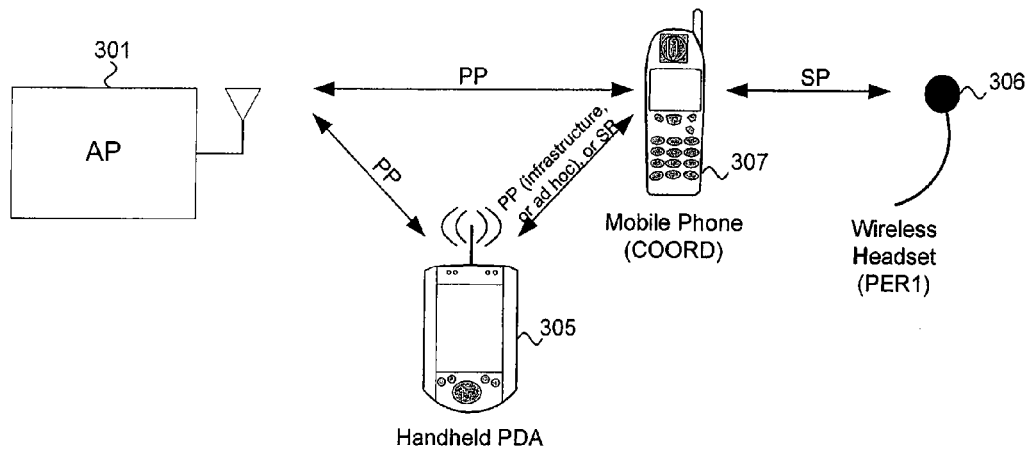
FIG. 3(d) is a block diagram showing further examples.

FIG. 3(d) is a block diagram illustrating a more complicated example. As shown there, AP 301 is coupled to wired network 303 and is wirelessly coupled with its associated stations: laptops 302(1) and 302(2), as well as a laptop 310 that is a COORD for a secondary wireless network, SWN1. Laptop 310 coordinates SWN1, which includes mouse 320, keyboard 322 and mobile phone 304. Mobile phone 304 can in turn be a COORD for another secondary wireless network, SWN2 while being a PER in SWN1. As shown, the communications with AP 301 use a PWN protocol, such as an 802.11x protocol, while the communications among devices in SWN1 and SWN2 are done using the SWN protocol. As explained elsewhere herein, there are many benefits of using an SWN protocol such as an 802.11x overlay instead of an all 802.11x protocol and by suitable design of the SWN protocol, the SWNs and the PWN can co-exist and, in the case of dual-net devices, can reuse common network interface devices for the dual-net device's participation in both a PWN and an SWN.

In the example of FIG. 3(d), it may be expected that mouse 320, keyboard 322, mobile phone 340 and headset 306 are not programmed for, and/or do not have circuits to support, use with an 802.11x primary network, but nonetheless they might use an SWN protocol that has many aspects in common with an 802.11x protocol, modified to accommodate the different needs of SWN devices while providing a measure of co-existence. The network interface for a dual-net device might comprise standard hardware for interfacing to the PWN and software to control that standard hardware to use it for SWN protocol traffic. Thus, with the selection of the SWN protocol such as those described or suggested herein, SWN support can be added to a computing device without requiring any new hardware.

Figure 4:
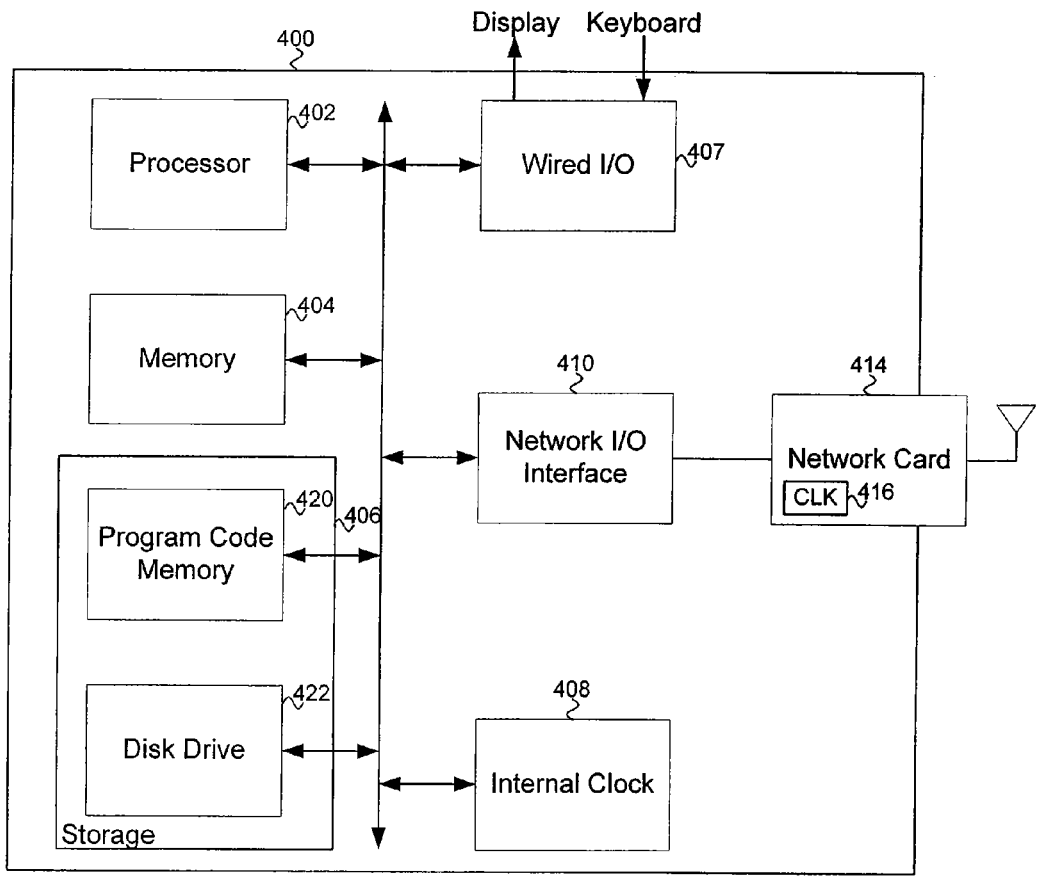
FIG. 4 is a block diagram of an example wireless PAN coordinator ("COORD") that might also operate as a dual-net device that could simultaneously maintain connections with a PWN and a SWN.

FIG. 4 illustrates an example of the internal details of a COORD device. As explained herein, such devices might include laptops, desktop computers, terminals, MP3 players, home entertainment systems, music devices, mobile phones, game consoles, network extenders or the like. What is shown is one example. In this example, a COORD device 400 is shown comprising a processor 402, the memory 404, program and software instruction storage 406, a wired input/output interface 407 for displays, keyboards and the like, an internal clock 408, and a network I/O interface 410, each coupled to a bus 412 for intercommunication. Network I/O interface 410 is in turn coupled to a network card 414, which includes its own circuitry such as an internal clock 416 and other components not shown. In some cases, the network card is not distinct and in some cases there might not even be much hardware associated with the networking function if it can be done by software instructions.

Program and software instruction storage 406 might comprise program code memory 420 and disk drive 422. Program instructions for implementing computing, communication, etc. functions, as well as network interfacing, can be stored in program code memory 420 and might be loaded in there from instructions stored on disk drive 422. Program code memory 420 might be just a portion of a common memory that also has memory 404 as a portion. For example, both memories might be allocated portions of RAM storage so that instructions and data used by programs are stored in one memory structure. With a general purpose, network-centric, signal processing-centric or other style of processor, functional modules that might be illustrated by blocks in a block diagram might be implemented entirely in software, embodied only in code stored in computer readable media. However, when executed as intended, the processor and the stored instructions perform the functions of those modules. For example, a device might be described as having a network stack that performs certain functions, but the network stack might not be represented in individual hardware elements.

Figure 5:
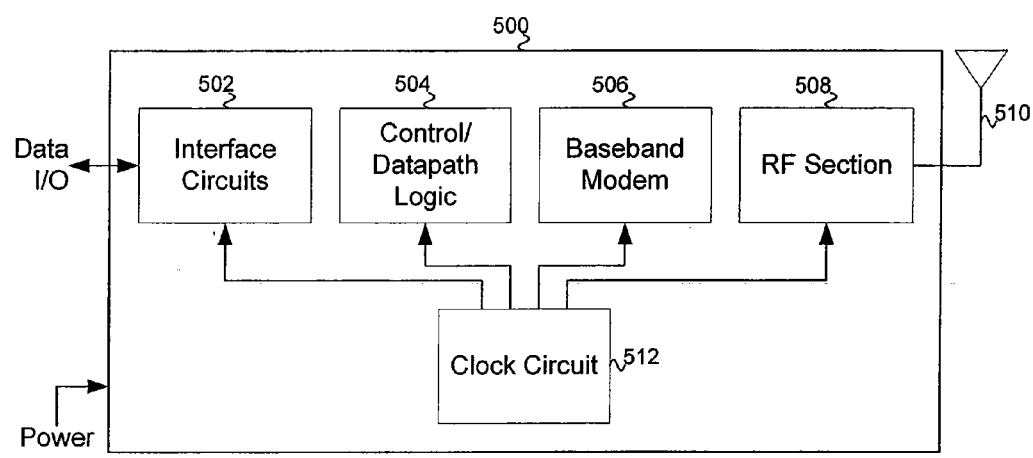
FIG. 5 is a block diagram of a network card that might be used to interface a COORD/dual-net device to the various networks.

FIG. 5 illustrates an example of a network card 500, shown comprising interface circuits 502 for interfacing network card 500 to a computing device (not shown), control/datapath logic 504, baseband modem circuitry 506, an RF section 508, an antenna 510 and a card clock circuit 512. Control/datapath logic 504 is configured to send and receive data to and from the computing device via interface circuits 502, send and receive data to and from baseband mode circuitry 506 and process that sent or received data as needed. Card clock circuit 512 might provide circuit clocking services as well as real-time clock signals to various other elements of network card 500. Note that logic elements shown and described might be implemented by dedicated logic, but might also be implemented by code executable by a processor. For example, some of the control/datapath logic's functionality may be implemented in software rather than hardware. An example processor is the ARM7 processor available from ARM Limited of London, England.

In operation of an example network card, power might be supplied via interface circuits 502 as well as providing a wired datapath for data into and out of the network card. Thus, when the connected computing device desires to send data over the network(s) supported by the network card, the computing device sends the data to an input circuit of interface circuits 502. The input circuit then conveys the data to control/datapath logic 504. Control/datapath logic 504 may format the data into packets if not already so formatted, determine the PHY layer parameters to use for the data, etc., and possibly other processes including some well-known in the art of networking that need not be described here in detail. For example, logic 504 might read a real-time clock from card clock circuit 512 and use that for data handling or include a real-time clock value in header data or other metadata.

Logic 504 then outputs signals representing the data to baseband modem circuitry 506 which generates a modulated baseband signal corresponding to the data. That modulated baseband signal is provided to RF section 508. The timing of output of signals of logic 504 and other parts of the network card might be dictated by a timing clock signal output by card clock circuit 512. RF section 508 can then be expected to output an RF, modulated signal to antenna 510. Such output should be in compliance with requirements of nodes of the networks with which the computing device is associating.

For example, if the computing device is expecting to be associated as a node in an 802.11b network, the signal sent to antenna 510 should be an 802.11b compliant signal. Also, the control/datapath processes should process data in compliance with the requirements of the 802.11b standard. Where the computing device is expecting to be a dual-net device, the signals sent should be compliant with the protocols and/or standards applicable for the network to which the signals are directed, and be done in such a way as to deal with the fact that while communication is happening among devices of one network (such as the primary wireless network or the secondary wireless network), those signals might be heard by devices that are only devices in a different network (such as the secondary wireless network, the primary wireless network or other network) and the signals should be such that devices can at least co-exist.

Where the computing device is a dual-net device, its network card would provide signals for the primary network and the secondary network. In one example mentioned herein, the primary network is an 802.11x network and the computing device is a STA node for that network and the secondary network is a PAN and the computing device is the COORD for that network. In some implementations, network communications are handled using a software platform that supports network applications.

In some embodiments, wherein 802.11x or other PWN protocols do not need to be supported, the built-in wireless circuitry or network card could be designed to handle only SWN protocols, as would be the case where the network comprises all devices that are capable of handling SWN protocol communications. Examples of such protocols include protocols that operate between devices built by H-Stream Wireless, Inc. to communicate using an H-Stream protocol such as their HSP protocol. In some HSP-enabled devices, the network logic can be entirely represented with software that accesses the RF section of a device that might be a generic network interface, possibly using additional hardware. However, where both ends are HSP-enabled devices, they might use their own hardware and control it at whatever level is needed for best performance.

Figure 6:
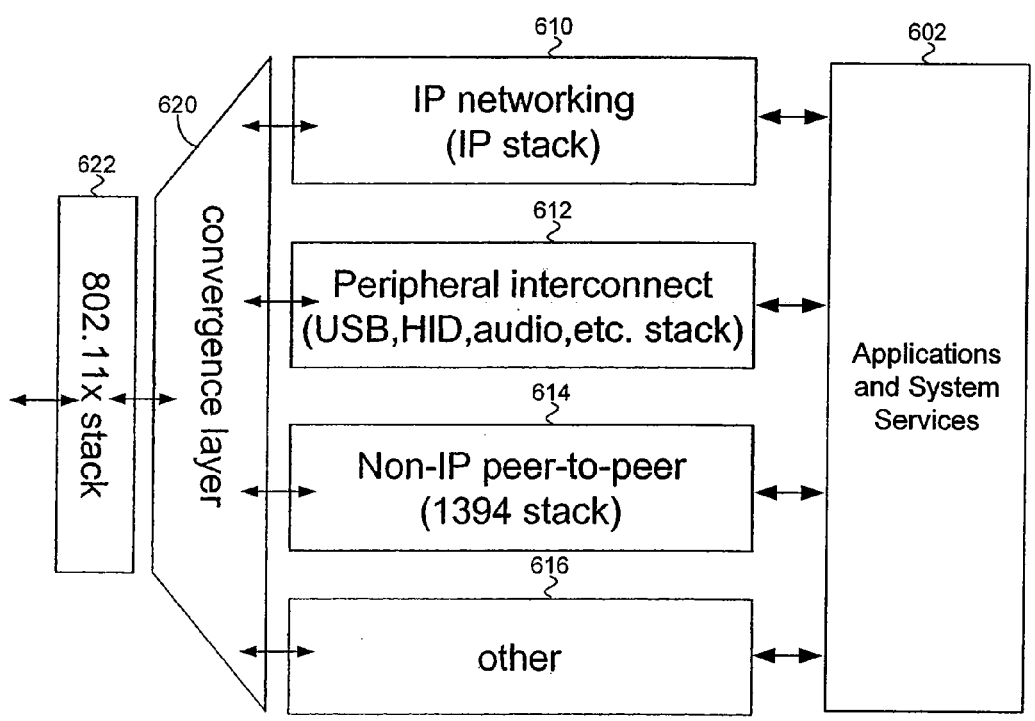
FIG. 6 is a block diagram of software components that might comprise software and/or logical constructs to interface applications with the networks supported by a COORD/dual-net device.

FIG. 6 illustrates a platform 600 as it might be present in a dual-net device, that represents software and/or logical constructs that together can be thought of as logical elements available for processing data within the computing device. As such, they need not be implemented as separate hardware components or distinct software components, so long as their functionality is available as needed. Other variations are possible, but in the layout shown, applications and system services (shown as block 602) are programmed to interface to various stacks, such as an IP networking stack 610 (sometimes referred to as an "IP stack"), a peripheral stack 612 (USB, HID, audio, etc.), a non-IP stack 614 (for IEEE 1394 interfacing) or other stack 616. For example, an application such as an HTTP browser might expect to communicate using TCP/IP and thus that application would have been configured to communicate with the computing device's IP stack.

A convergence platform can be added between an 802.11x stack and the different drivers to enable multi-protocol support, expose and coordinate access to specific MAC service primitives and coordinate the priority handling in Quality-of-Service (QoS) sensitive applications. This convergence platform can be a separate software layer or can also be integrated within the 802.11x stack.

For certain stacks, additional services may be required that might not be supported inside the 802.11x stack. If that is the case, such overlay protocol services may reside either inside the convergence layer or in between the convergence layer and the respective stack. As an example, communication with peripherals may require protocol services in addition to the protocol services provided by the 802.11x stack in order to meet the power and latency requirement typical of such applications. Such protocol services may be part of the convergence layer, or may reside in between the convergence layer and the Peripheral Interconnect Stack. Of course, as an alternative, the 802.11x stack may have been adapted to support such services.

Each of the stacks 610-616 is shown coupled to a convergence layer 620, which provides the necessary and/or optional conversions of data, protocol, timing, etc. so that each of the higher level stacks 610-616 are interfaced to an 802.11x stack 622. 802.11x stack 622 can then interface to the computing device's network card (or other network circuitry). In this manner, for example, stack 622 might handle a browser's traffic that goes through IP stack 610 while also handling a mouse interface whose traffic goes through peripheral stack 612. Note that with a single 802.11x stack, a single network interface can carry traffic for more than one higher-level stack. The single network interface needs to be tuned to deal with the different requirements of the different stacks.

Communication protocols can be implemented with drivers or firmware that is installed on the dual-net device/COORD. The drivers or firmware might comprise an 802.11x peripheral service function (e.g., for implementing the services of the overlay protocol that are not supported inside the 802.11x stack), which can be application-independent, and an adapter driver to connect the 802.11x stack and 802.11x peripheral service function to the appropriate driver inside the dual-net device/COORD platform. The adapter driver may be device class or device specific.

Figure 7:
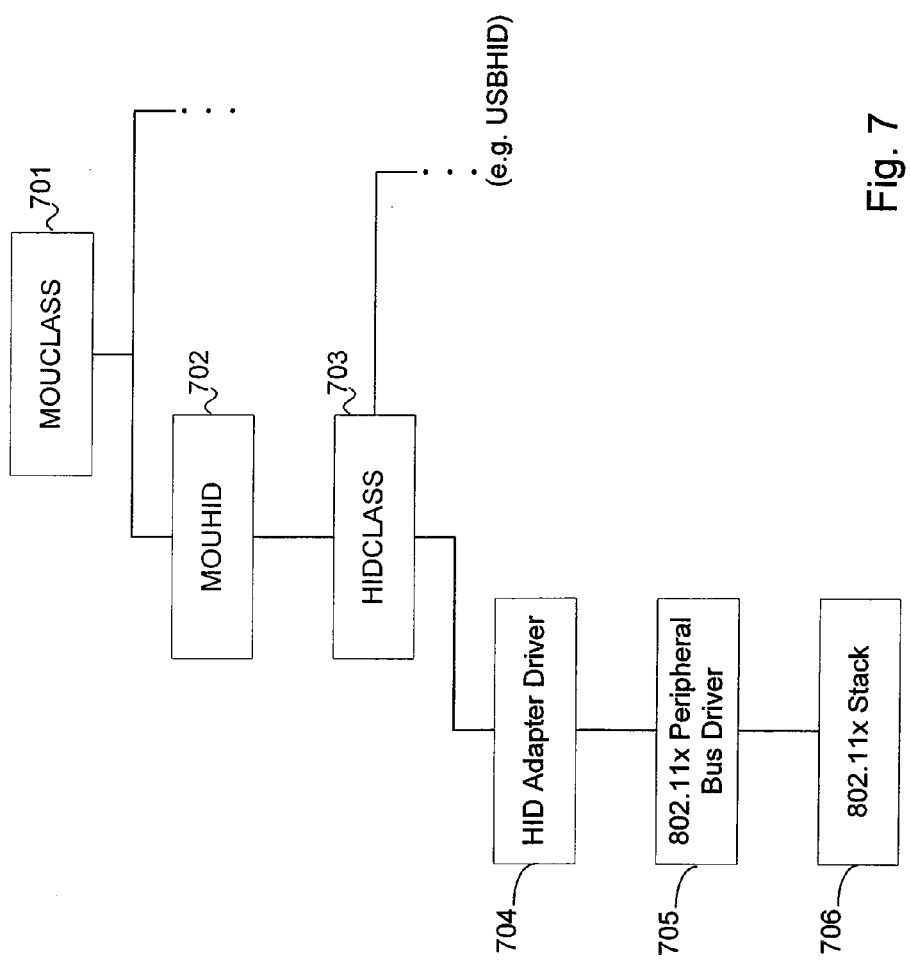
FIG. 7 is a block diagram of classes and objects that might be used in an interface between a network and applications.

An example of this is illustrated in FIG. 7 for a wireless PAN where a mouse is connected over the WM to the standard HID class driver in a PC running on the Windows (or other applicable Operating System (OS)). The driver or firmware resides between the 802.11x stack 706 and the standard HID class driver 703. In a specific implementation, the driver or firmware can constitute an HID adapter driver 704 and an 802.11x peripheral bus driver 705.

Other variations of what is shown in FIG. 7 are possible. For example, the 802.11x peripheral service function might connect up to the MOUHID driver 702 directly. In that case, the HID adapter driver is written as an HIDCLASS miniport driver. This driver then layers under the MOUHID 702 and MOUCLASS 701 drivers and allows mouse data to be injected into the operating system.

Alternatively, the adapter driver may connect to the USB stack instead. The adapter driver may, for example, be written as a virtual USB bus driver and connect up to the standard USB stack available as part of the operating system or operating system modifications. Depending on the specific implementation, the adapter driver may connect at different layers into the USB stack.

In specific embodiments, the 802.11x peripheral service function and adapter driver may be combined in a single driver. Alternatively, two separate drivers may be used and a private interface might be defined and used between both drivers.

The adapter driver receives the 802.11x frames from the 802.11x peripheral service function that are intended for the higher layer driver (e.g., MOUCLASS driver). Similarly, the adapter driver receives frames from the higher layer driver that are to be transmitted to a PER using the 802.11x circuitry. The adapter driver and 802.11x peripheral service function generate and decode the necessary packet header for running a specific application, like the HID protocol, over an 802.11x data channel. For example, it removes the 802.11x-specific MAC header and performs the necessary manipulation to transform it in the correct format to be passed on to the respective class driver.

Figure 8:
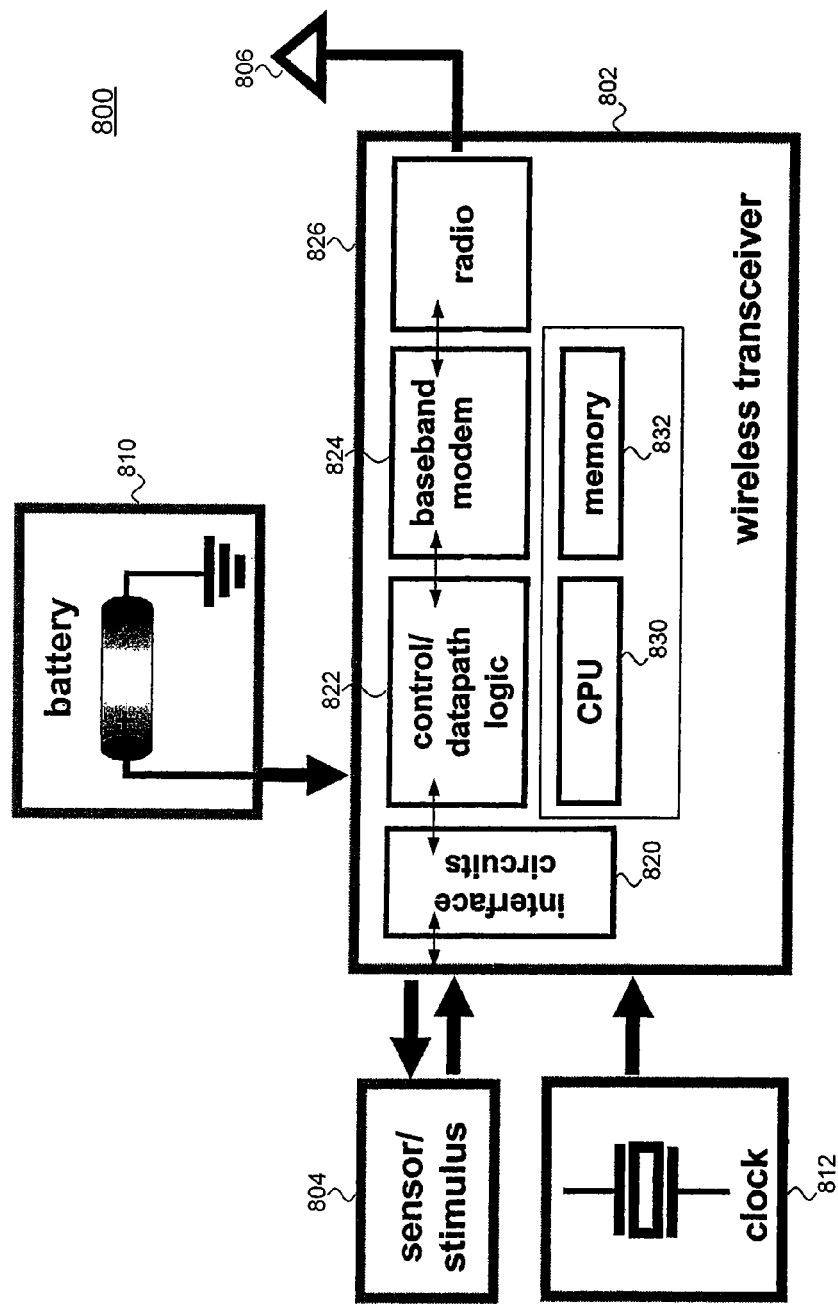
FIG. 8 is a block diagram of an example of a PER device.

FIG. 8 is a block diagram illustrating an example of what might be the components of a PER device. As shown, PER 800 comprises a wireless transceiver 802 coupled to sensor/stimulus elements 804 and antenna 806. Additional components, such as a filter, a balun, capacitors, inductors, etc., may be present between wireless transceiver 802 and other elements. Generally, wireless transceiver 802 allows other networked devices to understand results of sensing (in the case of a PER that does sensing, such as a mouse, microphone, remote condition sensor, etc.) and/or to specify stimulus (in the case of a PER that outputs visual, audio, tactile, etc. outputs, such as a printer, headset, etc.). It should be understood from this disclosure that PER can be a wireless input and/or output device and in many cases, the wireless transceiver can be designed independent of the particular input and/or output.

FIG. 8 also shows a battery 810 and a clock circuit 812. Battery 810 provides power for wireless transceiver 802 and elements 804 as needed. As weight and portability are likely to be important in the design of the PER, battery consumption will often have to be minimized for a good design. Clock circuit 812 might provide real-time clock signals as well as providing circuit timing clock signals.

As shown, wireless transceiver 802 comprises interface circuits 820, control/datapath logic 822, a baseband modem 824, and an RF section 826. Control/datapath logic 822 might be implemented with circuitry that includes a central processing unit (CPU) 830 and memory 832 for holding CPU instructions and variable storage for programs executed by CPU 830 to implement the control/datapath logic. Control/datapath logic 822 might include dedicated logic wherein CPU 24 and memory module 25 implement the portion of the communication protocol that is not implemented in the dedicated control and datapath logic. The CPU instructions might include digital signal processing (DSP) code and other program code. The other program code might implement MAC layer protocols and higher-level network protocols.

Clock circuit 812 might include a crystal oscillator. Clock circuit 812 might be aligned with clocks in other network devices, but the clocks may drift over time relative to each other.

Although not shown, other components like capacitors, resistors, inductors, filters, a balun, a Transmit/Receive (T/R) switch, an external power amplifier (PA) and an external low-noise amplifier (LNA) may also be included in PER 800.

Wireless transceiver 802 might be configured so as to communicate over the physical layer (PHY) of a standard IEEE 802.11-compliant circuit chip. Wireless transceiver 802 may be an embedded System-on-Chip (SoC) or may comprise multiple devices as long as such devices, when combined, implement the functionality described in FIG. 8. Other functionality, in addition to the functionality of FIG. 8 may also be included. Wireless transceiver 802 might have the ability to operate, for example, in the unlicensed 2.4-GHz and/or 5-GHz frequency bands.

As used herein, a "slave device" is a device that takes direction from a master device on predetermined aspects of operations based on the state of the master device rather than the state of the slave device (if there is a mismatch). Thus, for synchronization, the timebase of the master device controls. Where the slave device is remote from the master device, the timebases might mismatch (disagree) and synchronization can be used to match them up, or at least get them to match as close as needed for a particular application.

Thus, slave devices are part of a communication system and are to be synchronized to the master timer of the communication system, wherein the master timer is generated maintained and/or implemented in a master device that is part also of the communication system. It is assumed that the master timer may or may not be available real-time at a sufficiently low level in the system for an accurate real-time timestamp to be included in transmitted packets (or other signals if packets are not used).

Synchronization may, for example, be used to allow the master device and/or the slave device to power down some, most or all of its circuitry outside a communication event. The timers may then be used to trigger a wake up of the appropriate circuitry at the start of the communication event.

Master and slave devices can be network cards, computers, peripherals, telephones or other communication and/or digital circuit devices: such devices might be implemented as hardware, programmable logic and/or firmware/software instructions stored on an electronically readable medium to appropriately program a processor to execute steps to implement one or more processes described herein. In some cases, a synchronization process only has access to a wireless module at a high level, possibly resulting in indeterminate delays in getting and sending timing information.

Examples of computing devices include, but are not limited to, personal computers, laptops, telephones, televisions or PDAs. The wireless interface may be a WLAN wireless interface, but other wireless communication protocols may also be used. The wireless protocols might be 802.11x (x=a, b, g, n, etc.), 802.15.x (x=1, 3, 4, 3a, 4a, etc.), 802.16 or any other protocol.

Figure 9:
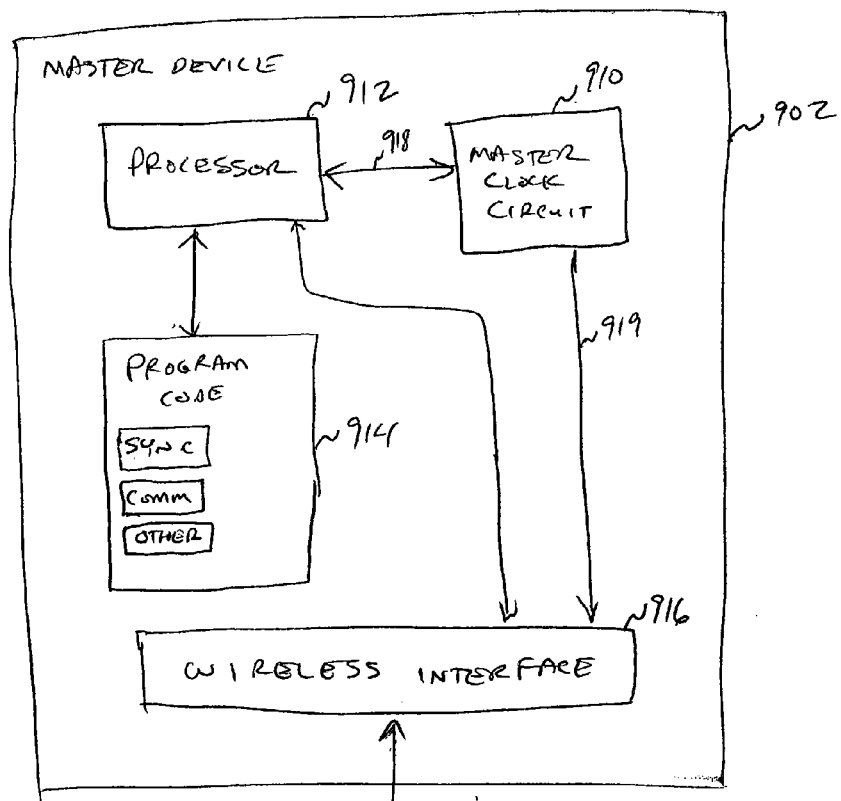
FIG. 9 is a block diagram illustrating a master device and a slave device wirelessly coupled, such that synchronization signals can be conveyed between them.
Figure 9:
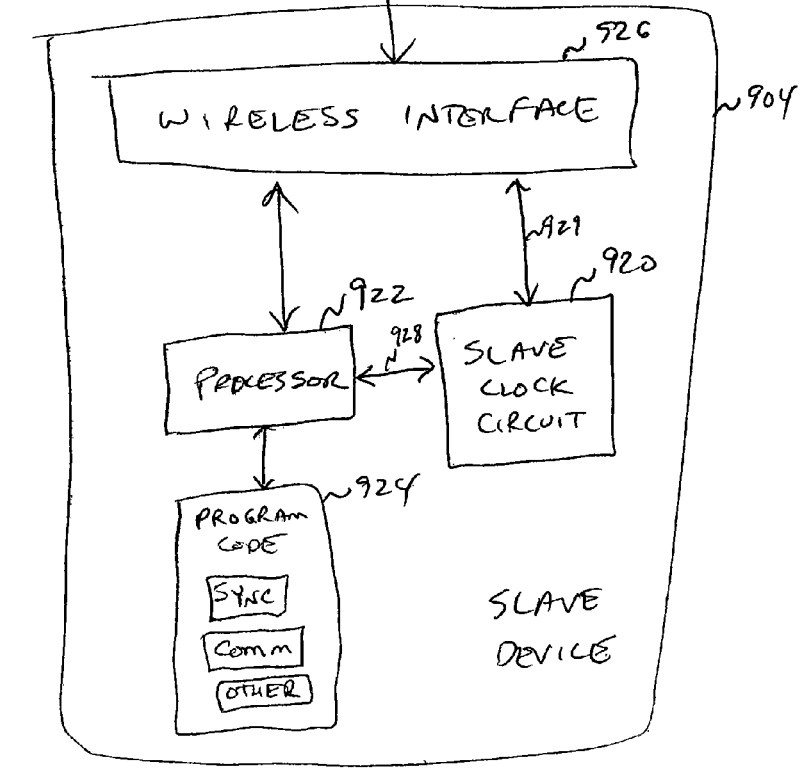

FIG. 9 illustrates one master device and one slave device as might be present for a synchronization process. Note that synchronization might occur between the master device and multiple slave devices (not shown).

As shown, a master device 902 comprises a master clock 910, a processor 912, storage for programming code 914 and a wireless interface 916. Processor 912 can be a general or specific purpose processor able to execute instructions provided in storage 914, and in alternate embodiments, hardware dedicated to that functionality is used rather than a processor that executes instructions. A slave device 904 comprises a slave clock 920, a processor 922, storage for programming code 924 and a wireless interface 926. This specific embodiment assumes a wireless communication system but other communication systems and alternative schemes for computation of the system master time may be used as well.

While various elements are shown connected by paths, other paths might be present and not shown and some paths might introduce indeterminate delays for signals traveling those paths. Storages 914 and 924 might include programming code for implementing synchronization processes described herein (shown as "SYNC"), programming code for communication functions ("COMM") and possibly other ("OTHER") functionality.

On some paths, such as paths 918 and 919 of master device 902, timing information might be delayed by an indeterminate time delay and in some cases, the delay between the sampling of a timebase value and the transmission of a packet including an indication of that timebase value might also be an indeterminate time delay. As a result, having a timebase value determined at the master device, inserted into a packet and transmitted an unknown (or at least unspecifiable) time later is not suitable to allow slave devices to determine the master timebase.

If the master timebase were available for transmission with a determinate time delay, that master timebase might simply be transmitted and received at each slave device to synchronize their timebases. One reason a master timebase might not be available is where a synchronization program relies on an interface to the timer, such as via an application programming interface (API) to a wireless module having the timer, and API calls are not controllable as to the time they take. One approach is to have the slave convey its timebase to the master, have the master determine the difference between the timebases and send a message conveying a value of that difference to the slave device, and then have the slave device reset its timebase accordingly.

Figure 10:
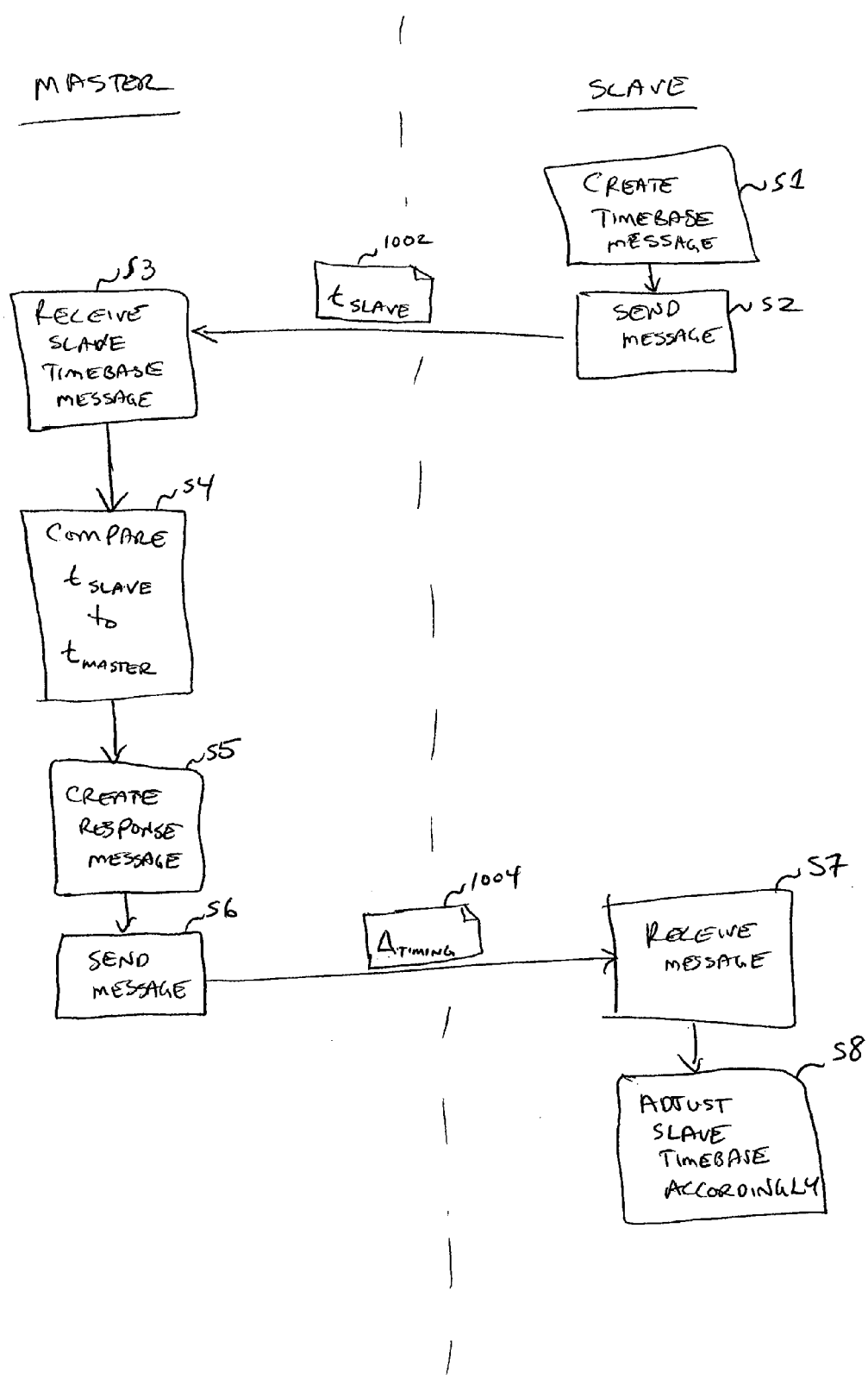
FIG. 10 is a swim diagram illustrating steps of a synchronization process between a master device and a slave device.

An example synchronization process is illustrated in FIG. 10. That figure shows various steps of the process arranged according to which device is performing the step. The steps are numbered S1, S2, etc. and performed in numerical order unless otherwise indicated.

In step S1, the slave device creates a message 1002 indicating a value for its timebase (e.g., accurate and real-time timing information of a local slave timer) and in step S2, it sends the message to the master device. This timing information may comprise a real-time representation $t_{slave}$ of the slave timer, but other timing information may also be possible. As an example, if the slave timer is implemented as a counter, it might not be necessary to send all bits that constitute the counter. It might be sufficient to only send a subset (e.g., only send the least significant bits) and let the receiver disambiguate the received data to determine the full counter value. In general, the slave device should send sufficient timing information to the master device for the master device to be able to derive the timing error between the master and slave timers, but the slave device need not send all timing information.

Where there is a determinate time delay between the creation of the message in step S1 and the sending of the message in step S2, that can be taken into account in setting the value in message 1002.

In step S3, the master device receives message 1002 and extracts the timing information, interpreting it as appropriate, such as by determining the inferred more significant bits of a timer value. In step S4, the master device compares the slave timebase ($t_{slave}$) to the master timebase ($t_{master}$) to determine a timing correction signal, $\Delta_{timing}$. If the slave device sends the real-time representation of the slave timer, then the timing correction signal may be obtained by comparing (2) the value of the master timer to the value of the slave timer. Other approaches to determining the timing correction might be used instead. The timing correction signal optionally may be subject to further processing at the master, slave or in part, both. Also, methods other than those shown and described herein could be used instead.

Once the master has determined the timing correction signal, it creates a response message 1004 (S5) and sends it (S6) to the slave device. Notice that the timing of the response message is not critical, as the slave device will read the timing correction signals from message 1004 and not need to rely on when message 1004 was sent or received. That avoids timing problems that would otherwise occur when the master device cannot accurately control or predict when a message will or can be sent.

After the slave device receives response message 1004 (S7), it can then adjust its timebase accordingly (S8).

At the start of a synchronization event, the master device waits for the reception of timing information from the slave device. There may be a delay between the start of a synchronization event and the reception of the signal by the wireless module of the master device. As an example, a delay may be introduced by the wireless interface at the slave device side as the wireless interface follows the appropriate access procedure to the wireless medium. However, generally the slave device is able to transmit a packet containing a timestamp with a determinable delay between obtaining the timestamp value and actually transmitting the packet.

Upon reception of the signal with the real-time value of the slave timer, $t_{slave}$, the wireless module propagates the timing information up to the circuit, code and/or logic that implements the synchronization functionality. The master device then computes the value of $t_{master}$ based on the above disclosed scheme and compares the obtained value to the value of $t_{slave}$ that was included in the signal sent by the slave device. Based on this comparison, the master device computes an estimate for the timing correction signal, $\Delta_{timing}$, that exists between both timers. The exact computation of $\Delta_{timing}$ depends on the specific implementation. Some time later, this error may be communicated back to the slave device over the wireless medium. This may happen during the same or during a subsequent communication event, and the slave device may decide to apply a timing adjustment based on $\Delta_{timing}$ either immediately or some time later.

Optionally, additional processing may be performed on $\Delta_{timing}$ prior to applying the timing adjustment to the slave timer. For example, $\Delta_{timing}$ might be "clipped" (i.e., limited to values within a finite range).

The master device may communicate the timing correction signal back to the respective slave device instantaneously, some time later during the same synchronization event, or some time later as part of a later synchronization event. Upon reception of the timing correction signal, the slave device may apply the timing correction immediately or some time later. Under certain circumstances, it may also decide to ignore the timing correction or apply only a partial adjustment. How frequently the synchronization procedure has to be repeated is implementation-specific and may depend on, among other things, the frequency drift of the slave timer and the target synchronization accuracy.

The further processing of the timing error signal may be performed inside the master device, may be performed locally inside the slave device, or may be implemented partially in the master device and partly in the slave device. For example, the master device might clip the timing error signal or the slave device might clip the error signal.

Examples of additional processing may include but are not limited to compensating for specific delays introduced in the loop by a specific implementation, compensating for master-to-slave frequency offset, applying an intentional offset or performing a filtering operation. The additional processing may reside inside the master device, or may be implemented locally inside the slave device. Alternatively, additional processing may be partially applied inside the master device and partially inside the slave device. As an example, an intentional offset may be applied to compensate for delays inserted into this synchronization mechanism by the system. An example of such delay may be the system delay that is introduced by transporting packets to and from the wireless module.

As another example, low-pass filtering may be desirable to filter out some of the high frequency jitter that may be present on the master timer. This processing may be performed in the master or slave device, or the processing may be split between the master and slave device.

In a slightly different implementation, the master device initiates the packet exchange by sending a first signal, herein referred to as a "poll signal" (which might be a poll packet), to the slave device at, or some time after, the start of the synchronization event. Delay between the start of the synchronization event and the transmission of the poll signal may, for example, be introduced by the wireless interface inside the master device following the appropriate wireless medium access procedures.

Upon reception of the poll signal, the slave device responds some time later with a signal that contains the real-time value of the slave timer, t herein referred to as the "poll response signal." Upon reception of the poll response signal, the master device may follow any of the procedures described above to derive an estimate $\Delta_{timing}$ of the timing error that exists between both timers. Some time later, this error may be communicated back to the slave device over the wireless medium. This may happen during the same synchronization event or during a subsequent synchronization event. As an example of the latter, the timing error may be included in the poll signal of the next synchronization event.

Similar to the implementation discussed above, the slave device may decide to apply a timing adjustment based on $\Delta_{timing}$ either immediately or some time later. Optionally, additional processing may be performed on $\Delta_{timing}$ prior to applying the timing adjustment to the slave timer.

The start of communication events is scheduled off the wireless module master timer, such as the TSF ("Timing Synchronization Function") timer used by WLAN devices, and the timebase inside the slave devices is adjusted occasionally to remain synchronized to the wireless module master timer. In the specific embodiment where a wireless module master timer is used, signals that are received from a slave device and contain slave timer timing information are timestamped with the real-time value of the wireless module master timer, $t_{master}$, at the time of signal reception by the master device. This information is passed on to the circuitry, logic and/or code that implements the synchronization functionality.

The circuitry or driver that implements the synchronization functionality computes the timing correction signal, $\Delta_{timing}$, based on the slave timing information and the real-time value of the wireless module master timer, $t_{master}$, in the same or similar way as described above with respect to previously described embodiments. This timing correction signal is communicated back to the respective slave device over the wireless medium. Similar to the implementation described above, the slave device may decide to apply a timing adjustment based on $\Delta_{timing}$ either immediately or some time later. Optionally, additional processing may be performed on $\Delta_{timing}$ prior to applying the timing adjustment to the slave timer.

In the case where a portion or all of the synchronization and/or communication functionality resides at a higher level in the system (that is outside the wireless module), it may be desirable or even necessary for the circuitry or driver that implements such functionality to signal to the wireless module at which value of the wireless module master timer a communication and/or synchronization event is expected to occur, by passing such information through the interface to the wireless module.

In a very specific embodiment, the proposed method may be applied as a synchronization technique in a wireless network, herein referred to as a secondary wireless network or SWN, where the wireless module of the master device of the SWN may also be used for communication with devices in a different wireless network, herein referred as the primary wireless network or PWN, or in devices that coexist with the primary network.

The device that is a master device in the SWN may be configured either as a master device or as a slave device in the PWN. It may also be the case that the device has the ability to be part of a primary network, but may or may not be actually part of such network. Independent of the exact configuration, as a master device of the secondary network, the device may or may not have the ability to transmit accurate and real-time timestamps of the secondary network's master timer, which may or may not be different from the first network's master timer.

As an example, the PWN can be an 802.11x WLAN and the SWN can be a network that uses protocols that are partially compatible with 802.11x WLAN protocols such that SWN transmissions induce desirable reactions in PWN devices.

Possible reasons why this might not be possible include but, are not limited to, (1) the synchronization process is run at a higher level and does not have sufficient control of timing to enable the transmission of accurate and real-time timing information, or (2) the wireless interface is not configured to transmit packets that include real-time accurate timing information. An example of the latter may be a device whose primary network is an infrastructure WLAN, and the device is a regular STA or slave device (that is non-AP) in the infrastructure WLAN that updates its timer based on beacons in packets it receives from the infrastructure WLAN AP. As a regular STA or slave device in the primary network, the device is typically not configured to transmit accurate real-time timing information. Alternatively, the master device of the secondary network may have the ability to transmit such information but decides to use novel synchronization methods disclosed herein.

In a communication system where multiple slave devices are synchronized to a single master timer, the master device may compute the timing error (1) on a per slave basis, (2) using a method and formula that is common to multiple or all slave devices, (3) or a combination thereof. The master device may furthermore communicate the timing correction information to its slave devices in a single packet that includes the timing correction information for multiple or all slave devices. As an example of the latter, a broadcast or multicast packet may be used. Alternatively, the master device may use multiple packets, each containing timing correction information, for one of its slave devices, to synchronize its slave devices. In that case, unicast packets directed to the respective slave device may be used.

Under specific circumstances, a larger system may be envisioned where it may be desirable that an electronic device wants to be part of two or more communication systems at the same time, where more than one of the communication systems implements a novel synchronization mechanism disclosed herein. It may furthermore be the case that the electronic device acts as the master device in certain communication systems, whereas it may act as a slave device in others.

One way to enable the simultaneous connectivity to multiple communication systems either as a slave or a master device is to treat each communication system as an independent system and support independent timers and synchronization information exchange for each communication system that the electronic device may belong to. However, this may increase the implementation complexity, limit the scalability, and potentially degrade the performance of the overall system comprising multiple networks. In many cases, it may be desirable to have the timers of multiple communication systems that share one or more electronic devices be related, rather than independent. An approach to solving this will now be described.

In a system using this approach, a first communication system comprises a first electronic device that acts as the master device of the first communication system. This electronic device may be a laptop, a personal computer, a PDA, a cellular phone, a television, or a set-top box, or other electronic device. The first communication system furthermore includes one or more slave devices. Examples of slave devices may include, but are not limited to, a mouse, a keyboard, a game controller, speakers, headsets, etc. At the same time, the first electronic device of the first communication system also desires to become part of a second communication system, either as the master device of the second communication system or as one of the potentially multiple slave devices of said second communication system. Examples of such configurations may include a first electronic device that desires to connect to another electronic device for data transfer or file synchronization.

As an example, a laptop, personal computer, PDA or cellular phone may desire to exchange data or synchronize files with another laptop, personal computer, PDA or cellular phone as part of a second communication system without disturbing the first communication system.

In another example, a television or home entertainment system in a first communication system communicates with speakers, remote controls or other slave devices of the first communication system. In addition, the television or home entertainment system may be communicating with a personal computer or other electronic device in a second communication system for data transfer.

In yet another example, a PDA or cellular phone and its peripherals, like a headset and/or keyboard form a first communication system. In addition, the PDA or cellular phone is part of a second communication system that, in addition to the PDA or cellular phone, also comprises a laptop or personal computer. In the second communication system, the PDA or cellular phone may be used as a wireless modem for the laptop or personal computer. In addition, the laptop or personal computer may also be part of a third communication system. Such third communication system may be completely independent of the first and second communication system and may, as an example, comprise the laptop or personal computer and one or more peripherals like a mouse, keyboard, headset, microphone, speaker, etc.

The novel synchronization methods described herein allow an electronic device that acts as the master device of a first communication system to become a slave device in a second network without giving up or disturbing its functionality as a master device in the first network. In the proposed method, the master timer of the first communication system is synchronized to the master timer of the second communication system, and the master timer of the second communication system effectively becomes the master timer of the entire system comprising both communication systems. The electronic device that acts as a master device in the first communication system and as a slave device in the second communication system is herein referred to as the "bridge device." When the bridge device desires to become a slave device in the second communication system, it records the value of its local timer (master timer of its first communication system), prior to updating its local timer to reflect the master timer of the second communication system. The difference between the old and new timer information is stored as the timer offset for the first communication system. The bridge device takes into account this timer offset when computing the timing error for slave devices in its first communication system.

In specific embodiments, it may take several synchronization events within the second communication system before a bridge device becomes a synchronized slave device in that communication system. In such embodiments, the master device of the second communication system may send multiple timing correction signals, spread over multiple synchronization events, to the bridge device. In order not to give up or disturb the bridge device's functionality as a master device in the first communication system, it may be desirable that such timing correction signals be accumulated and that the accumulated value be applied as a timer offset. Optionally, a lock detection mechanism may be used to detect when the bridge device is synchronized or "locked" to the master timer of the second communication system.

In short, what has now been described includes a method of synchronization in a communication system comprising one master device and one or more slave devices to synchronize to a common timebase, or master timer, without the need to transmit accurate and real-time master timer information. The communication system can be a wireless system, such as an 802.11 wireless LAN. A device can be synchronized with respect to a first wireless network using a wireless module or interface and re-use the same wireless module or interface to communicate with devices in a second wireless network. The device is the master device of the second wireless network, and uses this technique to achieve synchronization in the second wireless network.

Also described is a synchronization method where the slave device sends a timestamp to the master and the master sends back correction information to the slave. The master device can compute error from a wireless module timing reference or some other timing reference. Computations can be done at the master device, the slave device or in part at each of the devices.

Another synchronization method is described wherein the device that is the master device in a first network and slave device in a second network or vice versa requires no synchronization interruption in adding the additional network.

While the invention has been described with respect to exemplary embodiments, one skilled in the art will recognize that numerous modifications are possible. For example, the processes described herein may be implemented using hardware components, software components, and/or any combination thereof. Thus, although the invention has been described with respect to exemplary embodiments, it will be appreciated that the invention is intended to cover all modifications and equivalents within the scope of the following claims.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. A method of synchronization in a communication system comprising:
   determining, at a master device, whether a transmission from the master device to one or more slave devices can include a transmission time representing a time, using a common timebase, of the transmission from the master device to the one or more slave devices, such that a value of the transmission time is available to the one or more slave devices;
   if the transmission time is not includable such that the value of the transmission time is available to the one or more slave devices, synchronizing the master device and the one or more slave devices to a common timebase without requiring access to the transmission time from the master device.

2. A method of synchronizing a slave device timebase to a master device timebase, comprising:
   determining whether the master device can send an indication of master transmission time representing a time of a transmission from the master device to the slave device such that the slave device can use the indication to determine the time of the transmission from the master device;

if the indication is unavailable to the slave device, sending timing information from the slave device to the master device, the timing information representing the slave device timebase; and sending correction information from the master device to the slave device, the correction information representing a difference between the slave device timebase and the master device timebase, wherein the correction information is independent of a transmission time of a packet from the master device containing the correction information and independent of a transmission time of other packets from the master device to the slave device.

3. The method of claim 2, wherein the master device is a station in a first wireless network and a coordinator in a second wireless network, the method further comprising:

synchronizing the master device to the first wireless network using a wireless module; and reusing the wireless module to communicate with devices in the second wireless network, wherein the slave device is one of the devices in the second wireless network and the master device synchronizes to a common timebase without requiring transmission of accurate and real time master timer information to achieve synchronization in the second wireless network.

4. The method of claim 2, wherein including correction information comprises including correction information in a multicast or a broadcast packet.

5. The method of claim 2, wherein including correction information comprises sending correction information from the master device to the one or more slave device serially, one slave device at a time.

6. The method of claim 2, further comprising autonomously sending, from the slave device, timing information to the master device.

7. The method of claim 6, further comprising sending, from the master device, correction information to the slave device during a synchronization event in which the master device receives timing information from the slave device.

8. The method of claim 6, further comprising sending, from the master device, correction information to the slave device following a synchronization event in which the master device receives timing information from the slave device.

9. The method of claim 2, wherein sending timing information from a slave device comprises sending timing information in response to a signal from the master device.

10. The method of claim 2, wherein at least one of the steps of sending comprise exchanging synchronization information using synchronization-specific packets.

11. The method of claim 2, wherein sending comprises exchanging synchronization information using packets that are not specific to synchronization, thereby allowing for data and/or additional control/management information.

12. The method of claim 2, further comprising computing the correction information by comparing timing information from the slave device to timing information of the master device when the timing information from the slave device is received at the master device.

13. The method of claim 2, wherein the communication system is a wireless communication system.

14. The method of claim 13, wherein the wireless communication system uses, at least in part, 802.11 protocols.

15. The method of claim 2, further comprising:

calculating, at the master device, a difference between a timebase of the slave device as determined from the sent timing information and a timebase of the master device, after the timing information from the slave device is received at the master device;

computing correction information from the difference; and sending correction information based on the results of computing.

16. The method of claim 15, wherein computing correction information is performed partially inside the master device and partially inside the slave device.

17. The method of claim 15, wherein computing correction information includes one or more of low pass filtering, clipping the correction information when it exceeds a predetermined value, applying a static offset, applying a dynamic offset, and/or applying an adaptive offset.

18. The method of claim 15, wherein the method is performed to synchronize a plurality of slave devices to the master device and computing correction information is performed separately per slave device.

19. The method of claim 15, wherein the method is performed to synchronize a plurality of slave devices to the master device and computing correction information is performed in common for two or more slave devices.

20. The method of claim 15, wherein the method is performed to synchronize a plurality of slave devices to the master device and computing correction information is performed in part in common for two or more slave devices and in part performed separately per slave device.

21. The method of claim 2, wherein the master device is a bridge device is a device usable with a first wireless network and a second wireless network, the method further comprising:

synchronizing the bridge device to the first wireless network, wherein synchronizing comprises sending multiple timing correction signals, spread over multiple synchronization events, to the bridge device.

22. The method of claim 21, further comprising:

accumulating timing correction signals over the multiple synchronization events; and applying an accumulated value as a timer offset.

23. The method of claim 22, further comprising:

determining when a sufficient number of synchronization events has occurred to achieve a lock, and then applying the accumulated value as the timer offset.

24. The method of claim 2, further comprising:

signalling to a wireless module an indication of when a synchronization event is expected to occur.

25. The method of claim 2, wherein the master device timebase is a timebase of a wireless module used to interface the master device with a medium over which timing information is sent and received.

26. The method of claim 2, wherein the slave device timebase is a timebase of a wireless module used to interface the slave device with a medium over which timing information is sent and received.

27. A slave device that synchronizes a slave device timebase to a master device, having a master device timebase, using communications between the slave device and the master device, wherein the master device is such that it does not transmit an indication of master transmission time representing a time of a transmission from the master device to the slave device in a form usable by the slave device to determine the time of the transmission from the master device, the slave device comprising:

circuitry to calculate an offset between the slave device timebase and the master device timebase using correction information from the master device that is independent of a time-of-sending time of a packet from the master device containing the correction information and independent of a time-of-sending time of other packets from the master device to the slave device; and circuitry to adjust a slave device timebase based on the calculated offset, independent of the indication of master transmission time.

28. The slave device of claim 27, further comprising:
logic for sending timing information to a network channel, addressed to the master device, wherein the timing information represents the slave device timebase; and
logic for receiving and processing returned correction information received the master device, the correction information representing a difference between the slave device timebase and the master device timebase.

29. A method of synchronizing a slave device timebase of a slave device to a master device timebase of a master device, wherein the master device is a device configured such that application-level programs interacting with the master device are unable to include accurate time-of-sending information in packets directed to the slave device, and thus the master device is such that it does not transmit the time-of-sending information to the slave device in a form usable by the slave device to determine the time of the transmission from the master device, the method comprising:
sending timing information from the slave device to the master device in a packet created by the slave device, the timing information representing the slave device timebase;
receiving the packet at the master device;
associating a received timestamp with the packet, the received timestamp corresponding to a time of receipt of the packet at the master device;
comparing the received timestamp and the timing information to determine correction information representing a difference between the slave device timebase and the master device timebase; and
providing the correction information to logic at the slave device for adjusting the slave device timebase, wherein the correction information is independent of the time-of-sending information.

30. The method of claim 29, wherein comparing is done at the master device and providing comprises transmitting the correction information to the slave device.

31. The method of claim 29, wherein comparing is done at the slave device.

32. The method of claim 29, further comprising adjusting the slave device timebase using the provided correction information.

33. The method of claim 29, wherein the timing information sent from the slave device to the master device in the packet is the time-of-sending time of the packet according to the slave device timebase.

34. The method of claim 29, wherein packets sent by application-level programs at the master device are queued and sent at transmission times that are unknown to the application-level programs at the time of packet creation.

35. The method of claim 29, wherein the timing information from the slave device is a representation of a timestamp of the time-of-sending time from the slave device according to the slave device timebase.

* * * * *

UNITED STATES PATENT AND TRADEMARK OFFICE
CERTIFICATE OF CORRECTION

PATENT NO.        : 8,571,005 B1  
APPLICATION NO.   : 11/423657  
DATED             : October 29, 2013  
INVENTOR(S)       : Katelijn Vleugels et al.

Page 1 of 1

It is certified that error appears in the above-identified patent and that said Letters Patent is hereby corrected as shown below:

In the Specification

1.) Column 18, Line 61:

After "timer,", delete "t" and insert --$t_{slave}$--.

In the Claims

2.) Column 25, Claim 28, Line 9:

After "information", delete "received the" and insert --received from the--.

Signed and Sealed this  
Twenty-fourth Day of June, 2014

Michelle K. Lee  
*Deputy Director of the United States Patent and Trademark Office*